(12) United States Patent  (10) Patent No.: US 8,504,575 B2
Koran et al.  (45) Date of Patent: *Aug. 6, 2013

(54) BEHAVIORAL TARGETING SYSTEM

(75) Inventors: Joshua M. Koran, Mountain View, CA (US); Christina Yip Chung, Mountain View, CA (US); Abhinav Gupta, Menlo Park, CA (US); George H. John, Redwood City, CA (US); Hongfeng Yin, Cupertino, CA (US); Long-Ji Lin, San Jose, CA (US); Richard Frankel, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 11/394,343

(22) Filed: Mar. 29, 2006

(65) Prior Publication Data

US 2007/0260596 A1 Nov. 8, 2007

(51) Int. Cl.
  *G06F 17/30* (2006.01)
(52) U.S. Cl.
  USPC .......................................... 707/748; 707/758
(58) Field of Classification Search
  USPC ................................... 705/748, 758
  See application file for complete search history.

(56) References Cited

U.S. PATENT DOCUMENTS

| 6,453,315 | B1 | 9/2002 | Weissman et al. | |
|---|---|---|---|---|
| 6,839,680 | B1 * | 1/2005 | Liu et al. | 705/10 |
| 6,934,748 | B1 * | 8/2005 | Louviere et al. | 709/224 |
| 7,249,121 | B1 | 7/2007 | Bharat et al. | |
| 2002/0107844 | A1 | 8/2002 | Cha et al. | |
| 2002/0194055 | A1 | 12/2002 | Takakura et al. | |
| 2003/0037050 | A1 | 2/2003 | Monteverde | |
| 2003/0046265 | A1 | 3/2003 | Orton et al. | |
| 2003/0154282 | A1 | 8/2003 | Horvitz | |
| 2003/0177054 | A1 * | 9/2003 | Reinbold et al. | 705/10 |
| 2003/0220913 | A1 | 11/2003 | Doganata et al. | |
| 2003/0229629 | A1 | 12/2003 | Jasinschi et al. | |
| 2004/0103017 | A1 * | 5/2004 | Reed et al. | 705/10 |
| 2004/0107125 | A1 | 6/2004 | Guheen et al. | |
| 2005/0033771 | A1 | 2/2005 | Schmitter et al. | |
| 2005/0159996 | A1 * | 7/2005 | Lazarus et al. | 705/10 |

(Continued)

FOREIGN PATENT DOCUMENTS

| WO | WO 03/025696 A2 | 3/2003 |
|---|---|---|
| WO | WO 2005/006283 A2 | 1/2005 |
| WO | WO 2005/010702 A2 | 2/2005 |
| WO | WO 2005/119521 A2 | 12/2005 |

OTHER PUBLICATIONS

Server's definition (http://whatis.techtarget.com/definition/0,,sid9_gci212964,00.html).*
U.S. Appl. No. 11/394,342, filed Mar. 29, 2006, Brower et al.
U.S. Appl. No. 11/394,374, filed Mar. 29, 2006, Brower et al.
U.S. Appl. No. 11/394,353, filed Mar. 29, 2006, Brower et al.

(Continued)

*Primary Examiner* — Son T Hoang

(57) ABSTRACT

A behavioral targeting system determines user profiles from online activity. The system includes a plurality of models that define parameters for determining a user profile score. Event information, which comprises on-line activity of the user, is received at an entity. To generate a user profile score, a model is selected. The model comprises recency, intensity and frequency dimension parameters. The behavioral targeting system generates a user profile score for a target objective, such as brand advertising or direct response advertising. The parameters from the model are applied to generate the user profile score in a category. The behavioral targeting system has application for use in ad serving to on-line users.

24 Claims, 15 Drawing Sheets

U.S. PATENT DOCUMENTS

| | | | |
|---|---|---|---|
| 2005/0234763 A1* | 10/2005 | Pinto et al. | 705/10 |
| 2006/0080292 A1 | 4/2006 | Alanzi | |
| 2006/0155693 A1 | 7/2006 | Chowdhury et al. | |
| 2006/0155764 A1* | 7/2006 | Tao | 707/104.1 |
| 2006/0190439 A1 | 8/2006 | Chowdhury et al. | |
| 2006/0218141 A1 | 9/2006 | Tuttle et al. | |
| 2007/0011039 A1* | 1/2007 | Oddo | 705/10 |
| 2007/0100796 A1 | 5/2007 | Wang | |

OTHER PUBLICATIONS

U.S. Appl. No. 11/394,332, filed Mar. 29, 2006, Koran et al.
U.S. Appl. No. 11/394,358, filed Mar. 29, 2006, Chung et al.
The Extended European Search Report for the related European application 07754250.4.
U.S. Appl. No. 11/394,332, filed Mar. 29, 2006, Koran, Office Action dated Nov. 25, 2011.

* cited by examiner

BEHAVIORAL TARGETING SYSTEM

BACKGROUND OF THE INVENTION

1. Field of the Invention

The present invention is directed toward the field of behavioral targeting, and more particularly toward an online behavioral targeting system.

2. Art Background

The Internet provides a mechanism for merchants to offer a vast amount of products and services to consumers. Internet portals provide users an entrance and guide into the vast resources of the Internet. Typically, an Internet portal provides a range of search, email, news, shopping, chat, maps, finance, entertainment, and other Internet services and content. Yahoo, the assignee of the present invention, is an example of such an Internet portal.

When a user visits certain locations on the Internet (e.g., web sites), including an Internet portal, the user enters information in the form of online activity. This information may be recorded and analyzed to determine behavioral patterns and interests of the user. In turn, these behavioral patterns and interests may be used to target the user to provide a more meaningful and rich experience on the Internet, such as an Internet portal site. For example, if interests in certain products and services of the user are determined, advertisements, pertaining to those products and services, may be served to the user. A behavior targeting system that serves advertisements benefits both the advertiser, who provides their message to a target audience, and a user that receives advertisements in areas of interest to the user.

SUMMARY OF THE INVENTION

A behavioral targeting system determines user profiles from online activity. The system includes a plurality of models. A model defines parameters for determining a user profile score. Event information is received at an entity. The event information comprises on-line activity of the user. To generate a user profile score, a model is selected. The system generates the user profile score in a category by applying the parameters from the model to the user event information. The behavioral targeting system has application for use in ad serving to on-line users.

The architecture of the behavioral targeting system is extensible. For example, additional models, which contain different rules and weight parameters, may be added. Based on the data and meta-data of a new model, the behavioral targeting system may execute different behavioral models and rules within the same overall framework.

In one embodiment, the models comprise recency, intensity and frequency dimension parameters. The recency dimension parameters specify input to the profile score based on how recent the user event information occurred. The intensity dimension parameters provide input to the user profile score based on the effectiveness of the user event information to predict a target objective in the category. Also, frequency dimension parameters provide input to the user profile score based on frequency of occurrence of the user event information.

In one embodiment, the behavioral targeting system generates a user profile score for a target objective. For example, the target objective may include brand advertising and direct response advertising.

DETAILED DESCRIPTION

Figure 1:
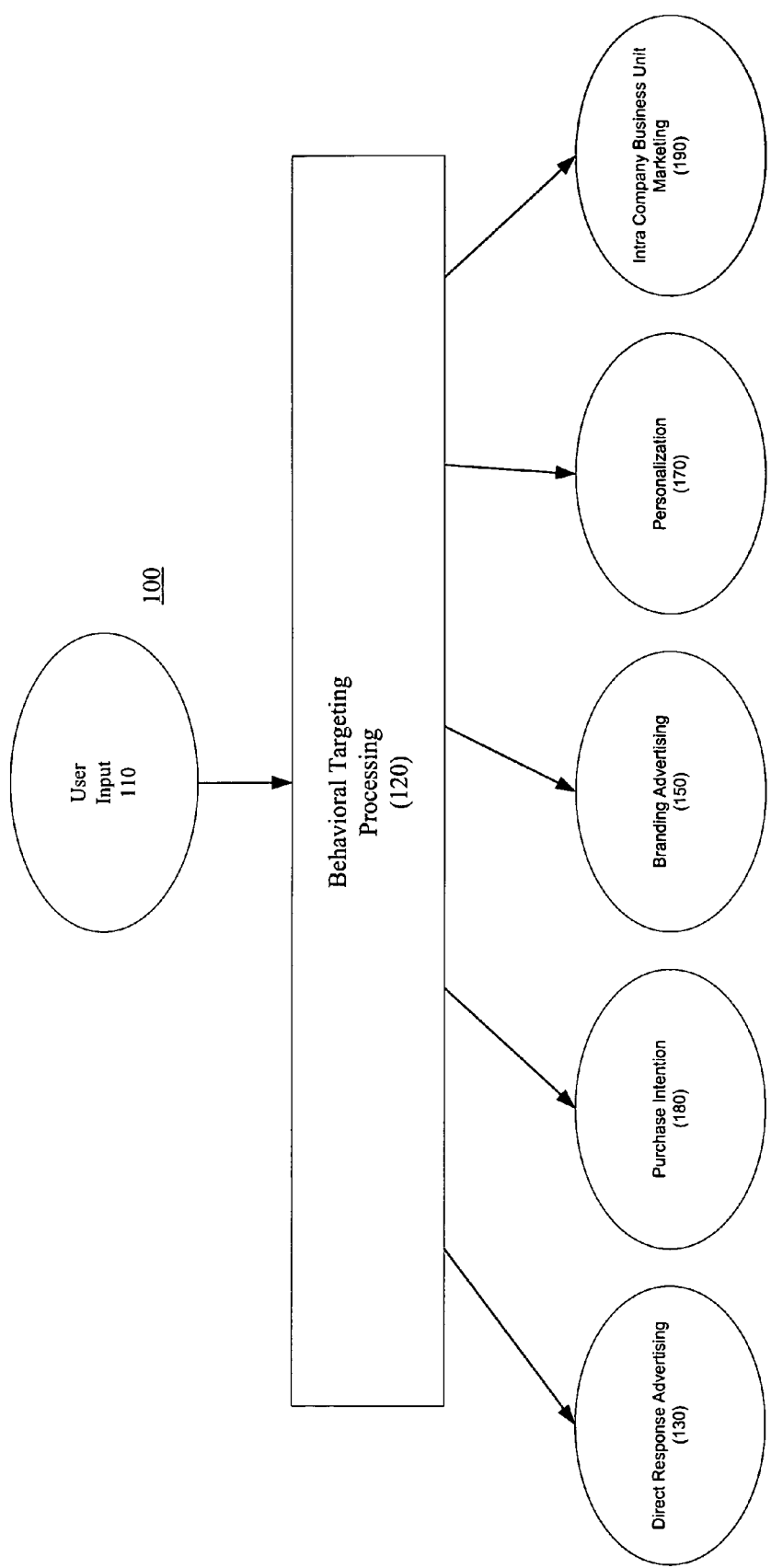
FIG. 1 is a block diagram illustrating a generalized behavioral targeting system.

Behavioral Targeting System Overview:

A behavioral targeting system has application to identify interests and behavior of online users for one or more target objectives. FIG. 1 is a block diagram illustrating a generalized behavioral targeting system 100. In general, the behavior targeting system 100 profiles interests and behavior of Internet users based on the user's online activities. As shown in FIG. 1, user input (110) is captured by behavioral targeting processing (120). In one embodiment, user input comprises one or more "events." As described more fully below, an event is a type of action initiated by the user (e.g., user clicks on a banner advertisement). As diagrammatically shown in FIG. 1, behavioral targeting processing (120) generates a plurality of user profiles specific for a target objective. In general, a user behavioral profile predicts user success for a particular target objective. For example, a user behavioral profile may predict a user's propensity to respond to a direct marketing advertisement campaign. In one embodiment, the user behavioral profile is expressed in a per category basis. For example, the user profile output may indicate that the user is a good candidate for the objective regarding the topic, "finance", and a poor candidate for the objective regarding the topic, "music."

The behavioral targeting processing 120 generates user behavioral profiles for various target objectives. In one embodiment shown in FIG. 1, the behavioral targeting system 100 outputs user behavioral profiles for direct response advertising (130), brand awareness advertising (150), purchase intention activities (180) and intra-company business unit marketing. In one embodiment, the behavioral targeting processing 120 generates user interest profiles for marketing objectives.

Figure 2:
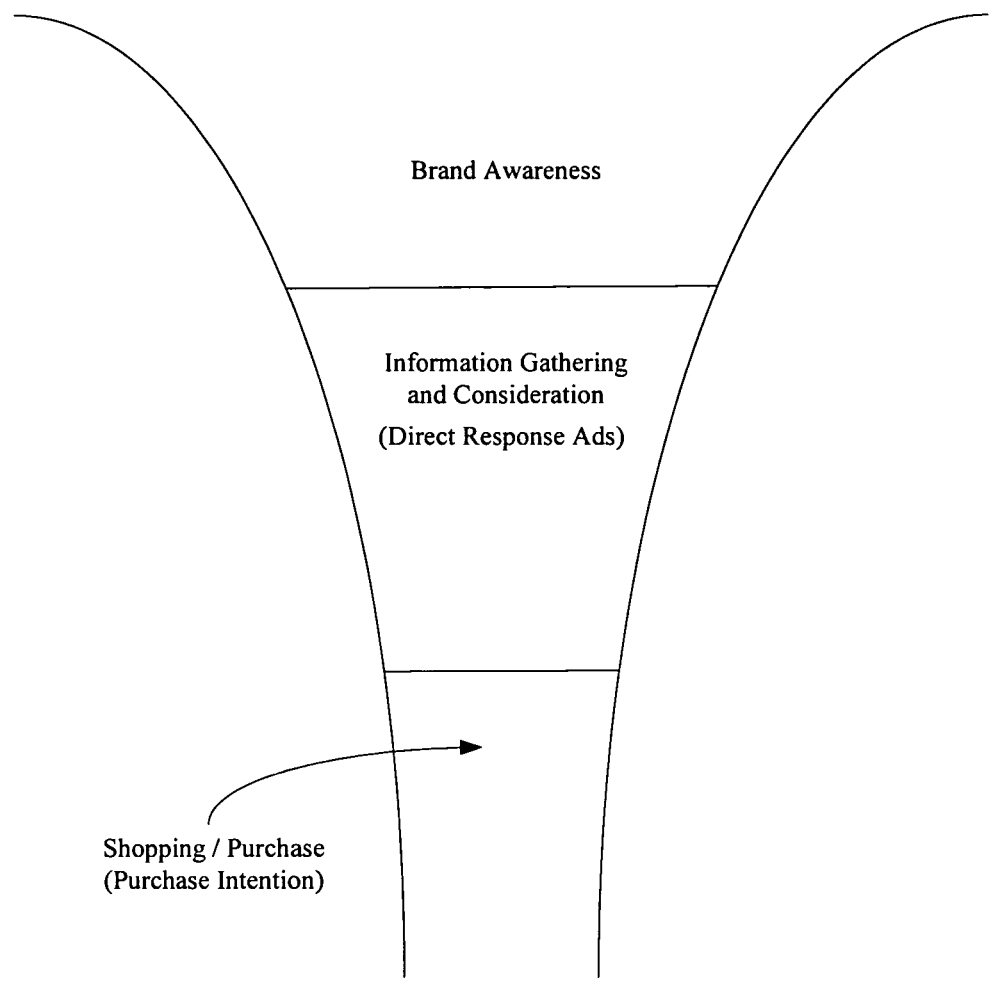
FIG. 2 illustrates a marketing funnel that identifies marketing objectives.

FIG. 2 illustrates a marketing funnel that identifies marketing objectives. At the top of the funnel, an advertiser may desire to acquire brand awareness for the advertiser's brand. Typically, for this type of marketing, the advertiser's goals are to promote a brand for a product by associating one or more positive images with the brand. This marketing objective is illustrated in FIG. 1 as brand advertising (150). In a second stage of the funnel, a user may desire to gather information for product consideration. To address this cycle of purchasers, advertisers may use direct response advertisements. There may be many different objectives associated with direct response advertising, including acquisition, retention, engagement, and monetization. The goal of acquisition is to get consumers to become a customer or visitor of the product/service. The goal of retention is to maintain existing customers or visitors (e.g., visitor of a Web site). The goal associated with engagement is to elicit more activity in existing customers. The goal for monetization is to increase profitability of the customer via active purchase activities, such as cross-selling, as well as passive activities, such as consuming banner ads.

In direct response advertising, the overall goal is to elicit an action or response from a customer. The behavioral targeting system of the present invention provides user profile data for direct response advertising (130). For example, an advertisement displayed on a web page that includes a link for the user to "click" is an example of a direct response advertisement. The last, and most focused part of the funnel, is the customer cycle of purchase intention. In this stage, the user is actively shopping, and intends to make a purchase. The behavioral targeting system of the present invention has application to provide user profile data for purchase intenders applications (180).

FIG. 1 also depicts an intra-company business unit marketing application as a marketing or target objective. For example, an Internet company may desire to attract users to a Web site or portal. The behavioral targeting processing may generate user profiles to acquire users to the Internet portal. For example, users from one business unit of the portal may be targeted to acquire users in a different business unit area based on the user's profile. Similarly, the user profiles may be generated for the target objective of engaging users to visit the Internet portal or Web site more frequently. Furthermore, the behavioral targeting processing may generate user profiles to retain users that have previously visited the Internet portal or Web site.

The marketing goals and objectives elicit user profile data to facilitate advertisers and marketers. The behavioral targeting system of the present invention also has application to provide user profile information to facilitate a user's online experience. In general, the goal is to match the right content to the right user at the right time (i.e., stimulus). For example, the behavioral targeting system may generate user profiles for personalization applications. In general, a personalization application uses the behavioral targeting information to customize a web page or web site experience for a user. For example, an Internet portal may display categories of products and services available. The Internet portal may customize one or more views of interest based on the user profile information. In another embodiment, behavioral targeting information may be used to determine content subject matter for user consumption. For example, after determining the content desired by the user, links to such content may be displayed on an Internet portal to permit the user to access the content.

A side bar application, displayed on the user's computer, provides links to the user's key destinations without requiring the user to launch a browser. In another embodiment for a personalization application, behavioral targeting information is used to select links so as to customize a side bar application. The target objective for personalization applications may be to maximize the user experience (i.e., user centric target objective) or to maximize a marketer's objective to deliver content to the users.

The architecture of the behavioral targeting system of the present invention provides a framework to operate as a generalized behavioral targeting system. The models contain meta-data and rules to customize the processing of event information. Thus, by selecting different model and rules, a different program flow or execution, specified by the meta-data, is realized. The architecture of the behavioral targeting system of the present invention is extensible. If new model and rules are created (e.g., new data and meta-data), then the new model and rules are plugged into the general architecture to provide new functionality and flow to the behavioral targeting system. Thus, the system may be modified to support new models as well as process new event types.

The general framework may be configured to generate one or more outputs from the same or a subset of the inputs. For example, the behavioral targeting system may be configured to generate multiple outputs for different user or target (e.g., marketing) objectives. The behavioral targeting system of the present invention uses different models depending on the objective of the system. Thus, a single behavioral targeting system may be implemented to support various objectives, including those applications identify above and shown in FIG. 1.

Figure 3:
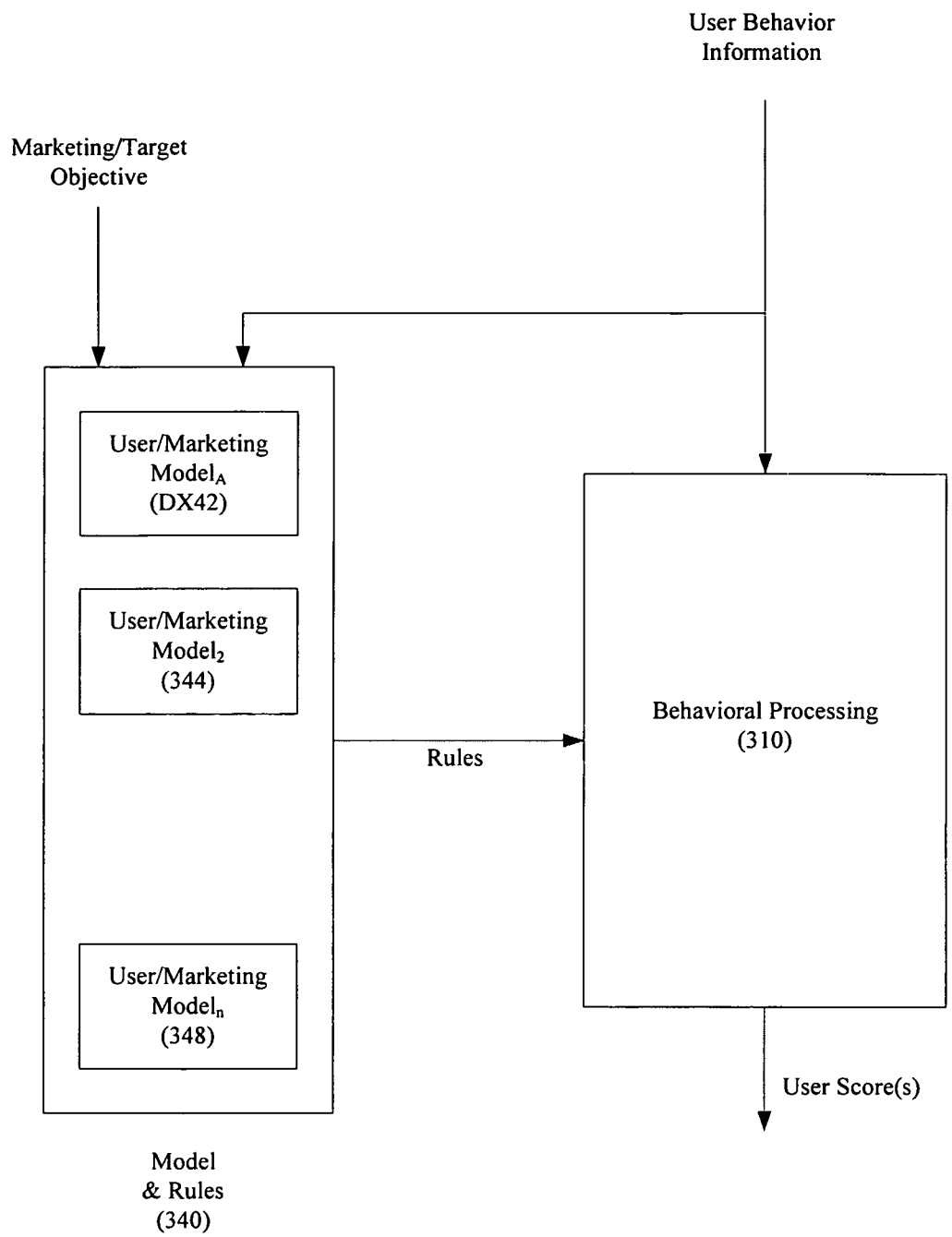
FIG. 3 is a block diagram illustrating one embodiment for a generalized behavioral targeting system.

FIG. 3 is a block diagram illustrating one embodiment for a generalized behavioral targeting system. The generalized behavioral targeting system generates user scores for one or more objectives. To this end, model & rules 340 store a plurality of models for different marketing and user objectives. In operation, user behavioral information is input to behavioral processing 310. Also, one or more user/marketing objectives are input to model & rules 340 to select one or more models. In turn, one or more models from model & rules 340 are input to behavioral processing 310. Behavioral processing 310 uses the model & rules selected to generate user scores. Specifically, a user score is generated for one or more user/marketing objectives.

In one embodiment, the user behavioral scores or profiles may be used for reporting. For this embodiment, the system processes the inputs into user profiles. Then, marketers determine how to most effectively use the profiles: targeting content/search results, personalizing content/search results, or using the profiles to understand the attitudes of the consumer by inputting the profiles into various reporting and analytical systems.

In one embodiment, the behavioral targeting system also outputs information to marketers to permit them to understand the inventory per category per score range (i.e., the number of people/cookies with a given score range in a specific category and/or the forecast of the events associated with these people/cookies. This information identifies to the marketer the rough audience size for effective use of the behavioral profiles, regardless of the marketer-centric use, targeting, or visitor-centric use, personalization.

Figure 4:
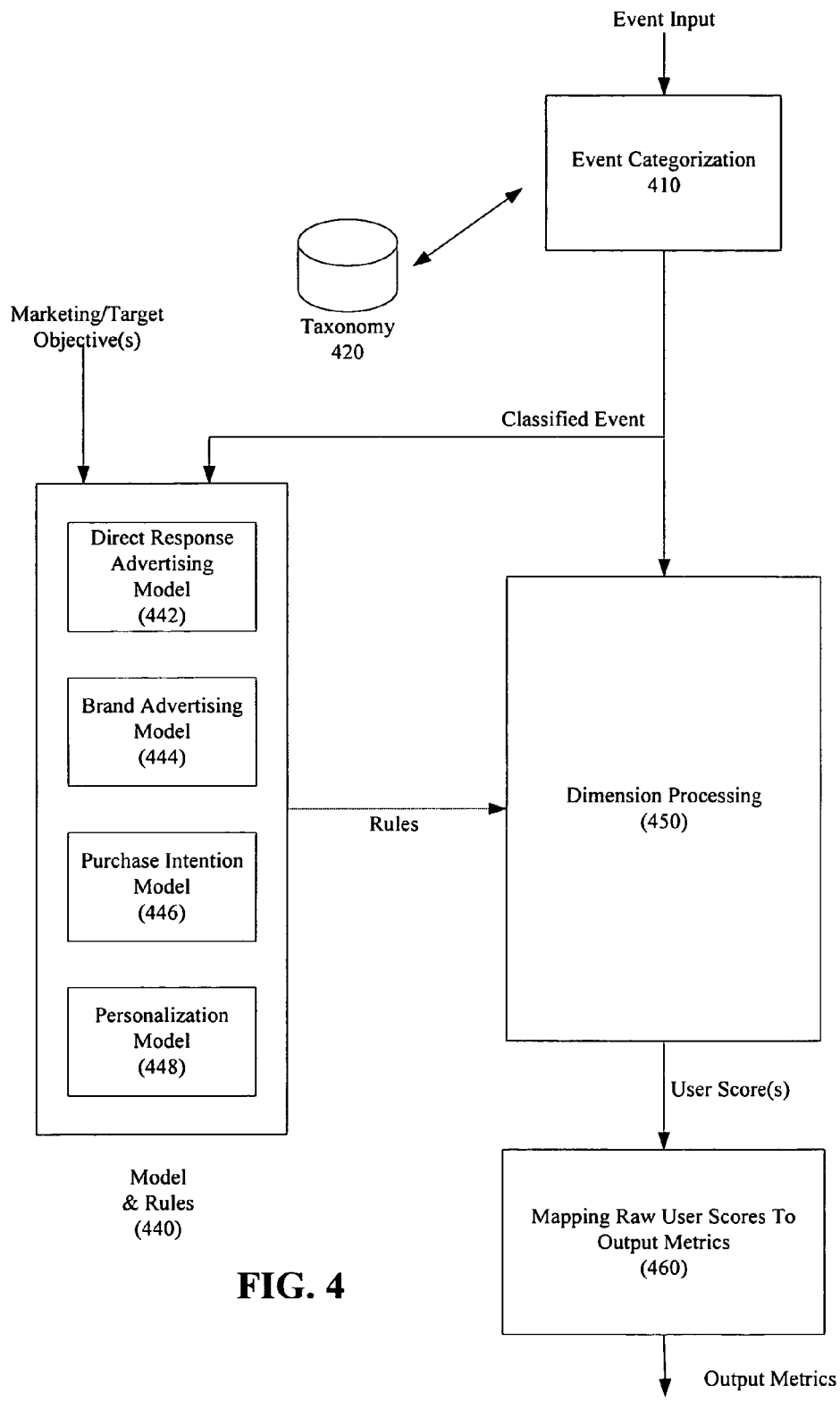
FIG. 4 is a block diagram illustrating one embodiment for the behavioral targeting system of the present invention.

In one embodiment, the behavioral targeting system of the present invention generates profile scores, by category, to predict user propensity for subject matter in the category for the target objective. For example, the interest score may be used to model the strength of the user's interest in purchasing a product or service within a category. FIG. 4 is a block diagram illustrating one embodiment for the behavioral targeting system of the present invention. For this embodiment, input events, referred to herein as "events", are input to an event categorization module 410. The event categorization module 410 operates in conjunction with taxonomy 420. Specifically, the event categorization module 410 classifies each input event into a category in taxonomy 420. In general, taxonomy 420 defines a plurality of categories for classifying user interests. Categories within taxonomy 420 may be arranged hierarchically. For example, the taxonomy 420 may comprise a high-level category for "music", and several subcategories, located underneath the "music" category, for different genres of music. Any taxonomy of categories used to classify subject matter may be used in conjunction with the behavioral targeting system without deviating from the spirit or scope of the invention.

As shown in FIG. 4, the classified events are input to dimension processing 450 and to model & rules 440. Also, user/marketing objectives are input to model & rules 440. Model & rules 440 contains a plurality of different models for different objectives or goals (e.g., direct response advertising (442), brand advertising (444), purchase intention (446) and personalization (448)). Each model has a plurality of rules associated with the model. The rules are used to process the events, in dimension processing (450), to generate the user scores for the different objectives or goals. In one embodiment, the rules, corresponding to a model, contain parameters specific for the event as well as the category classified for the event. For example, if the event type is a "page view" classified in "finance", then models and rules 440 selects parameters based on the event, page view, and the category, "finance."

The parameters, selected in model & rules 440, are input to dimension processing 450. Dimension processing 450 also receives, as input, the classified event. In general, dimension processing 450 generates a user score, using the parameters, for the category. As described more fully below, dimension processing 450 accumulates events for processing over a specified period of time. For example, in one embodiment, dimension processing 450 accumulates events to generate a short-term user interest score. In another embodiment, dimension processing 450 accumulates events over a longer period of time (e.g., over a month) so as to formulate a long-term user interest score.

As shown in FIG. 4, the user interest score is input to a mapping module 460. In general, the mapping module maps raw user scores to one or more output metrics. For example, one output metrics may determine the propensity for a user to click on an advertisement classified in the category. This metric, expressed in a percentage, is referred to as a "click through rate" (CTR). For this example, mapping module 460 may provide a function to map the raw user score to a CTR value.

Figure 5:
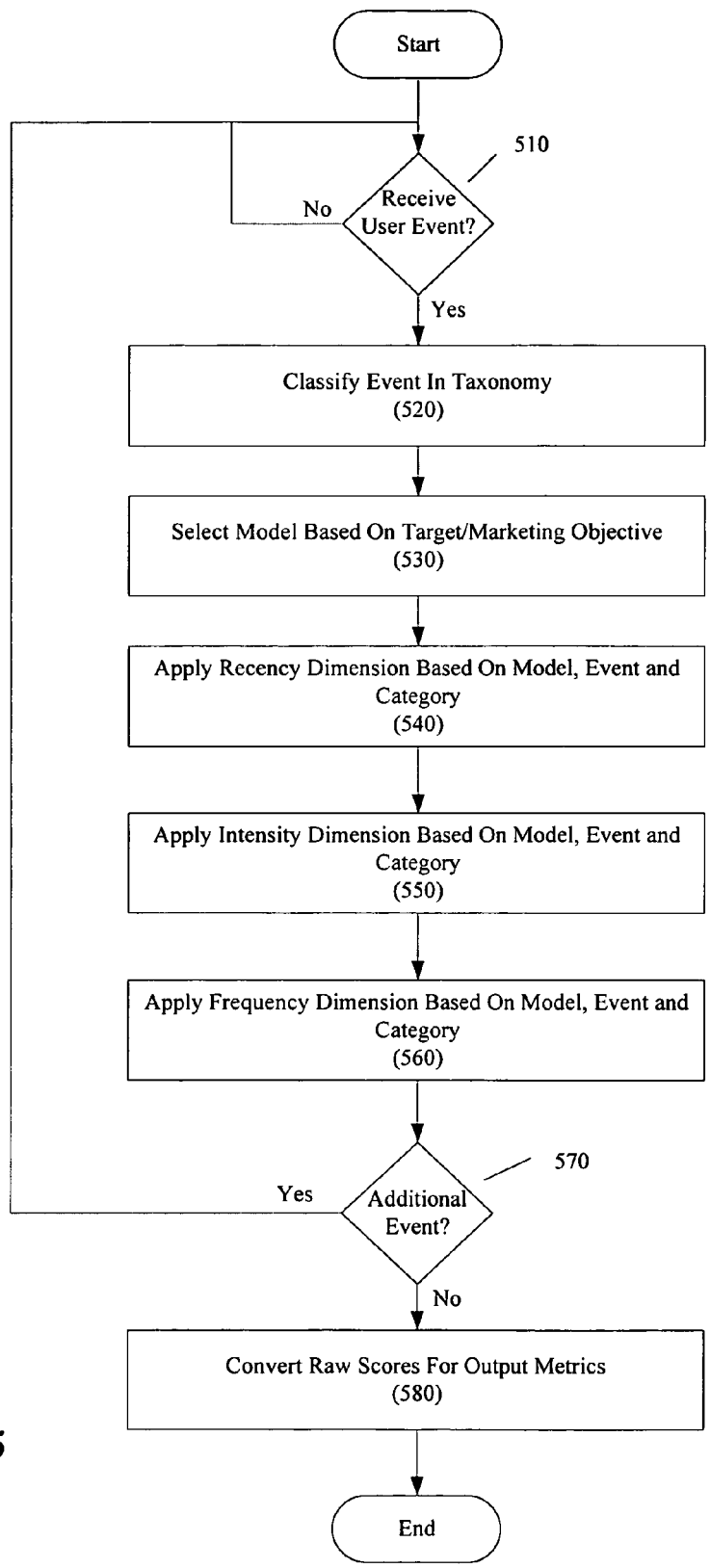
FIG. 5 is a flow diagram illustrating one embodiment for the generalized behavioral targeting system of the present invention.

FIG. 5 is a flow diagram illustrating one embodiment for the generalized behavioral targeting system of the present invention. When the system receives a user event or after a predetermined amount of time for accumulating events, the system classifies the event in a category of the taxonomy (FIG. 5, blocks 510 and 520). A model is selected based on the user/marketing objective (FIG. 5, block 530). In blocks 540, 550 and 560, the behavioral targeting system processes one or more events to generate a raw user interest score for a category. For this embodiment, the behavioral targeting system applies a recency dimension based on the model selected (FIG. 5, block 540). In general, the recency dimension weighs one or more events depending upon how recent the events have occurred. To apply a second dimension, the behavioral targeting system applies an intensity dimension based on the model selected (FIG. 5, block 550). The intensity dimension applies a weight or factor to ascribe a value indicative of how effective the event measures the user's interest in the subject category. For this embodiment, the behavioral targeting system also applies a third dimension, frequency (FIG. 5, block 560). In general, the frequency dimension modifies the user score, for the subject category, based on how frequently the event occurs.

As shown in FIG. 5, the process comprises a loop to process multiple events. However, as described more fully below, the behavioral targeting system may accumulate events over time, and may batch process the events, with a delay, to obtain a user interest score for multiple categories. In another embodiment, the behavioral targeting system may operate in real-time. For this embodiment, the behavioral targeting system may accumulate events over a short period of time, such as an hour, and then process those events to give a short-term user interest score.

In one embodiment, the raw user interest scores are converted for an output metric (FIG. 5, 580). However, the raw score does not need conversion in order to match content to users. In order to determine the appropriate weights and decay parameters to generate a score, a single marketing objective is used (e.g., click-through rate for direct response and purchase event for purchase intenders). The raw score from these behavioral targeting applications is correlated to the target objectives. Mapping raw scores helps augment the degree of correlation. However, once the raw scores have been mapped, the ability to rank order users' relative interests across categories is lost.

Event Processing & Categorization:

In one embodiment, events include advertisement clicks, search queries, search clicks, sponsored listing clicks, page views, and advertisement views. However, events, as used herein, may include any type of online navigational interaction or search related events. Generally, a page view event occurs when the user views a web page. For example, a user may enter, within an Internet portal, a web page for music by clicking on a link for the music category page. For this example, a page view event is recorded for the user's view of the music category page.

An advertisement view event occurs when the user views a web page for an advertisement. For example, an Internet portal may display banner advertisements on the home page of the portal. If the user clicks on the banner advertisement, the portal redirects the user to the link for the corresponding advertiser. The display of a web page, in response to the click, constitutes an advertisement click event. A user may generate multiple page view events by visiting multiple web pages at the advertiser's web site.

An advertisement click event occurs when a user clicks on an advertisement. For example, a web page may display a banner advertisement. An advertisement click event occurs when the user clicks on the banner advertisement.

A search query event occurs when a user submits one or more search terms on a web based search engine. For example, a user may submit the query "Deep Sea Fishing", and a corresponding search query event is recorded with the search terms "Deep Sea Fishing." In response to a user query, a web based search engine returns a plurality of links to web pages relevant to the search query terms. If a user clicks on one of the links, a search click event occurs.

A sponsored listing advertisement refers to advertisements that are displayed in response to a user's search criteria. A sponsored listing click event occurs when a user clicks on a sponsored listing advertisement displayed for the user.

Figure 6:
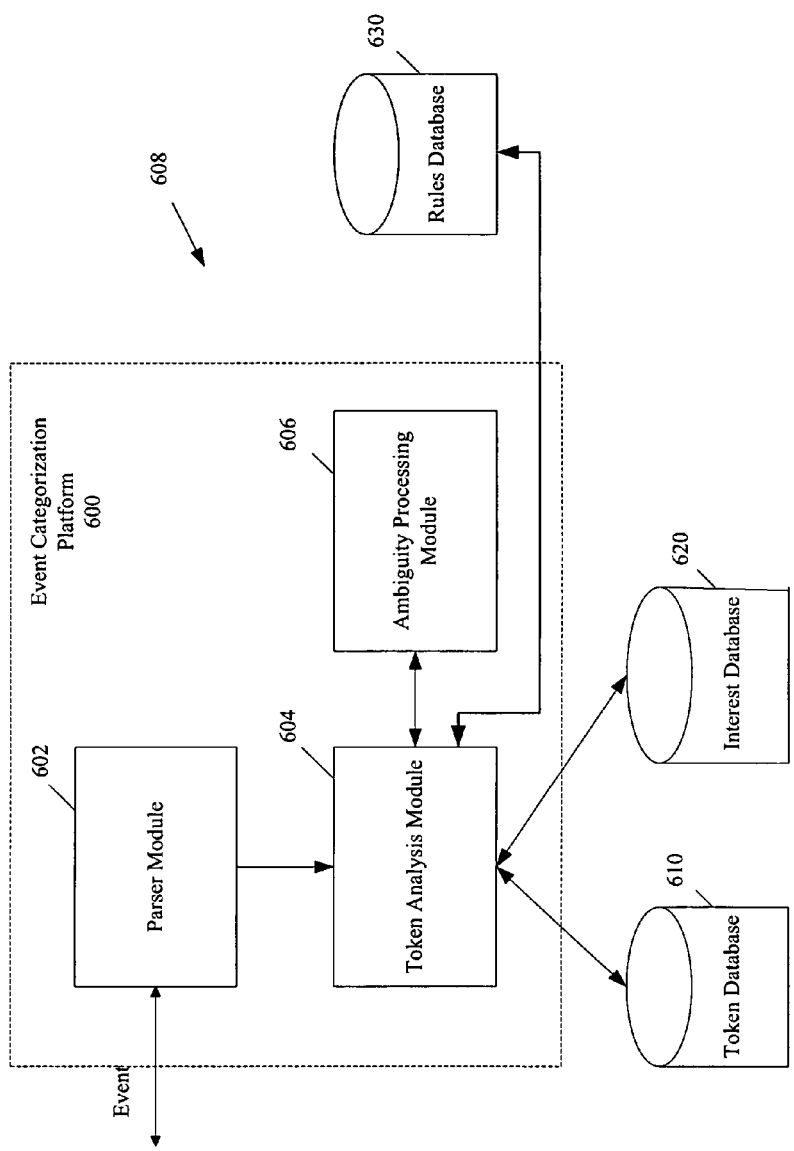
FIG. 6 is a block diagram illustrating on embodiment of event categorization for the behavioral targeting system.

FIG. 6 is a block diagram illustrating on embodiment of event categorization for the behavioral targeting system. As illustrated in FIG. 6, system 608 includes an event categorization platform 600 coupled to multiple databases, such as, for example, a token database 610, an interest database 620 and a rules database 630.

In one embodiment, the token database 610 stores a list of single-word or multi-word keywords, also known as tokens, collected automatically or, in the alternative, manually, from various servers, from editors, and/or from other third-party entities. Generally, the tokens represent a single concept and are treated as a single keyword even if they contain multiple word units. The tokens are further organized into a hierarchical taxonomy within the database 610 based on associations with their respective events of origin. In one embodiment, the hierarchical token taxonomy stored in the token database 610 is manually mapped into a hierarchical taxonomy of categorized tokens, which is further stored within the interest database 620. The hierarchical taxonomy is reviewed, edited, and updated automatically by the event categorization platform 600, or, in the alternative, manually by editors, and/or other third-party entities.

The mapping assigns one or more categories to each stored token, the assigned categories being subsequently stored within the interest database 620 at respective nodes associated with each corresponding token. In an alternate embodiment, the categories may not be mapped into a hierarchical taxonomy, but may be instead stored as a collection of categories within the interest database 620.

The event categorization platform 600 receives various events from the front-end web servers, such as, for example, search queries transmitted by users over a network, web page views, search results clicks, advertising clicks, and other types of interactive events, and enables automatic categorization of the received events based on data stored in the associated databases 610, 620, and 630, as described in further detail below.

In one embodiment, the event categorization platform 600 further includes a parser module 602 configured to receive an event, such as, for example, a search query, and to parse the event to generate multiple event units, such as, for example, query terms. The event categorization platform 600 further includes a token analysis module 604 coupled to the parser module 602 and configured to receive the event units from the parser module 602 and to categorize the event based on the event units and on data stored in the associated databases 610 and 620, as described in further detail below. Finally, the event categorization platform 600 includes an ambiguity processing module 606 coupled to the token analysis module 604 and configured to generate an ambiguity value corresponding to each categorized event, as described in further detail below.

Figure 7:
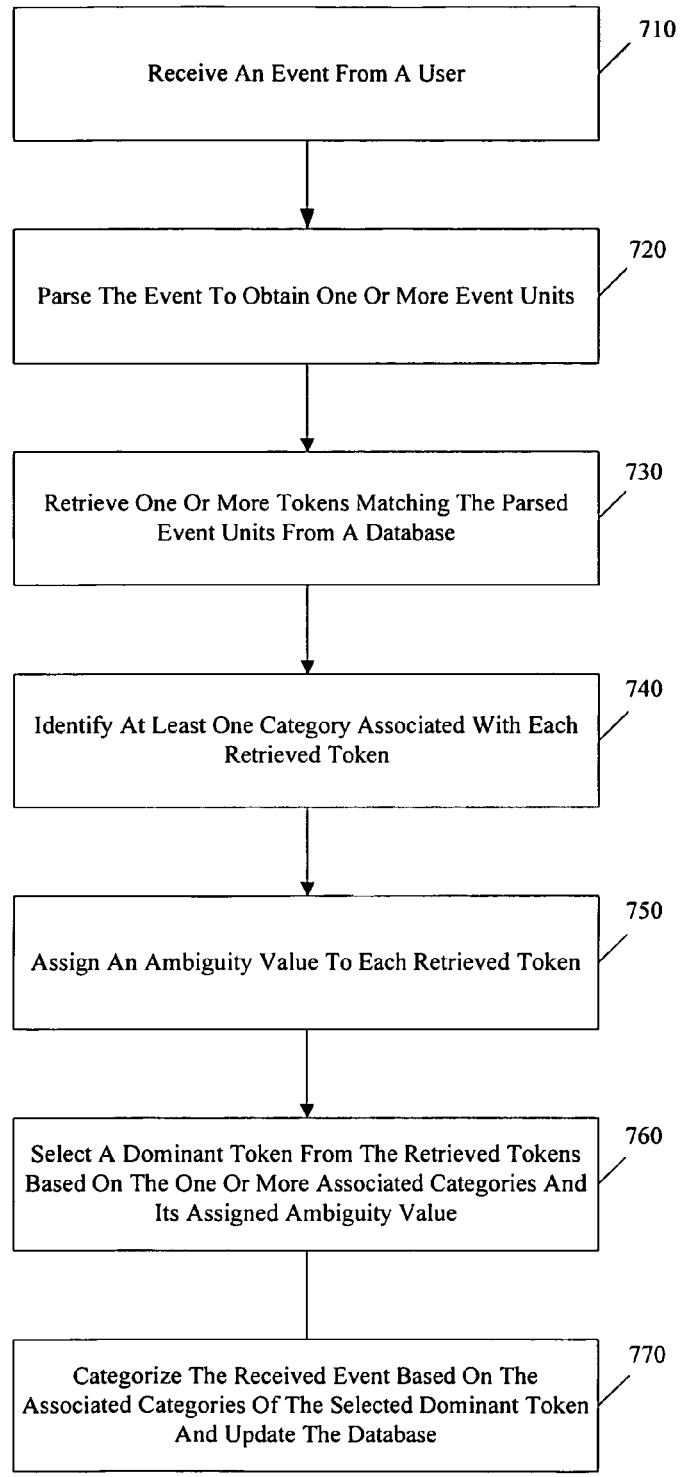
FIG. 7 is a flow chart illustrating a method to facilitate automatic categorization of events in a network, according to one embodiment of the invention.

FIG. 7 is a flow chart illustrating a method to facilitate automatic categorization of events in a network, according to one embodiment of the invention. As illustrated in FIG. 7, at processing block 701, an event, such as, for example, a search query is received from a user. In one embodiment, the user accesses a web page displayed in a client program of the client computer 820 (FIG. 8), and transmits a search query to the web servers via the client computer 820 and the network 830. The front-end web servers 840 receive the search query, and forward the query to the event categorization platform 600.

At processing block 702, the event is parsed to generate one or more event units. In one embodiment, the parser module 602 parses the event, such as, for example, the search query, to obtain one or more units (e.g., query terms), and transmits the units to the token analysis module 604.

At processing block 703, tokens matching the parsed event units are retrieved from the database. In one embodiment, the token analysis module 604 accesses the interest database 620, and retrieves one or more categorized tokens that match the parsed event units. Alternatively, the token analysis module 604 may access the general token database 610 to retrieve one or more matching tokens.

In one embodiment, the token analysis module 604 compares each event unit to tokens stored in the database 620, or, alternatively, in the database 610, and selects the longest possible tokens, (i.e., tokens having the greatest number of words or the greatest length). Alternatively, the token analysis module 604 selects the tokens that have the highest probability to appear within the registered events. The selection is based on a unit frequency parameter associated with each token, which specifies how many times each particular token is contained within the events.

At processing block 704, one or more categories associated with the retrieved tokens are identified. In one embodiment, the token analysis module 604 analyzes the retrieved categorized tokens and identifies one or more categories associated with the retrieved tokens. Alternatively, if the tokens are retrieved from the general token database 610, the token analysis module 604 may assign one or more categories to each retrieved token, either editorially or algorithmically, the assigned categories forming a corresponding hierarchical taxonomy, or may discard the tokens without an associated category.

At processing block 705, an ambiguity parameter value is assigned to each retrieved token. In one embodiment, the ambiguity processing module 606 receives the tokens from the token analysis module 604, and calculates a corresponding ambiguity value for each token, for example, as a factor of the conditional probability of the token category being the overall event category given the presence of the particular token within the analyzed event.

At processing block 706, a dominant token is selected from the retrieved tokens based on the associated token category, each token's assigned ambiguity parameter value, and a set of event processing rules stored within the rules database 630. In one embodiment, the token analysis module 604 applies predetermined processing rules to select the dominant token, such as, for example, rules specifying elimination of tokens that contain one or more stop words, rules specifying the minimum frequency of token appearance within stored events, and other rules designed to rank the retrieved tokens.

In one embodiment, in addition to the ambiguity parameter value, the token analysis module 604 assigns a confidence score, which represents an assessment of the accuracy of the dominant token selection and of the overall event categorization, and stores the confidence score with the corresponding overall event.

Finally, at processing block 707, the overall event is categorized based on the one or more token categories associated with the dominant token and the respective databases 610, 620 are updated to include the newly categorized event.

In an alternate embodiment, the token analysis module 604 may discard the overall event if the assigned confidence score is lower than a predetermined threshold score, thus indicating a low confidence that the categorization procedure described in detail above is accurate.

In another alternate embodiment, even if the assigned confidence score is lower than the predetermined threshold score, the token analysis module 604 may still store the confidence score along with the corresponding overall event. In this embodiment, other external modules and/or systems, such as, for example, a behavioral targeting system, which is configured to identify interests of users based on the users' online activities, or any of its components, may retrieve and discard the stored event if its associated confidence score is lower than the predetermined threshold score.

In yet another alternate embodiment, the event may be fractionally divided among the multiple categories corresponding to the retrieved tokens according to the ambiguity parameter value associated with each token. Subsequently, the event may be categorized within each token category according to an assigned weight equal to the corresponding ambiguity parameter value.

In an alternate embodiment for the method to facilitate automatic categorization of events, subsequent to the retrieval of one or more matching tokens, a vector of values including multiple statistical parameters corresponding to each retrieved token is assembled and input into a known neural network structure (not shown). Alternatively, the vector of values may be input into a known support vector machine (not shown), into a known non-linear regression mechanism (not shown), or into any known machine-learning unit that accepts vector input.

In one embodiment, the vector of values includes data related to each retrieved token. The statistical parameters for each token may include a frequency of token presence in event logs, a frequency of token presence inside a particular event, such as, for example, a search query, an ambiguity value of the token, a probability that the token dominates the overall event, a probability that the token dominates another token, the probability that a category associated with the token dominates the overall event, the probability that the category dominates a category associated with another token, and or other known statistical parameters that enable determination of the dominant token within the event.

In one embodiment, the machine-learning unit, such as, for example, the neural network structure, or, in the alternative, the support vector machine or the non-linear regression mechanism, is configured to receive the vector input and to determine an output value associated with each token, the output value indicating the probability that the corresponding token is the dominant token of the event. Subsequently, the machine-learning unit orders the calculated output values, selects the highest ranked output value, and transmits the selected output value to the token analysis module 604.

In one embodiment, in addition to determining each output value as the probability that the corresponding token is the dominant token of the event, the machine-learning unit further calculates a confidence score, which represents an assessment of the accuracy of the dominant token determination and of the overall event categorization. The confidence score is then transmitted to the token analysis module 604. In an alternate embodiment, the token analysis module 604 may calculate the confidence score using information received from the machine-learning unit.

The token analysis module 604 identifies a token corresponding to the selected highest output value and retrieves one or more categories associated with the token. Finally, the token analysis module 604 categorizes the event based on the one or more retrieved categories and updates the respective databases to include the newly categorized event.

In an alternate embodiment, the token analysis module 604 may discard the overall event if the assigned confidence score is lower than a predetermined threshold score, thus indicating a low confidence that the categorization procedure described in detail above is accurate.

In another alternate embodiment, even if the assigned confidence score is lower than the predetermined threshold score, the token analysis module 604 may still store the confidence score along with the corresponding overall event. In this embodiment, other external modules and/or systems, such as, for example, a behavioral targeting system, or any of its components, may retrieve and discard the stored event if its associated confidence score is lower than the predetermined threshold score.

In yet another alternate embodiment, the vector of values includes data related to a pair of tokens. The machine-learning unit receives the input vector and selects the dominant token, as described in detail above. Subsequently, the machine-learning unit receives data related to an additional token, compares the additional token to the selected dominant token and further selects a new dominant token. The procedure continues iteratively with the remaining tokens until all data is exhausted and a final dominant token is selected.

Behavioral Targeting System for an Advertising Application:

In one embodiment, the behavioral targeting system is used to serve advertisements online to users based on the user's interest in the category or topic of the advertisement. Online advertising is used to market a variety of products and services. In general, online advertising is used to build brand awareness among potential customers and to facilitate online purchases of products and services. One type of online advertising, referred to as brand marketing, is to promote a brand to a target audience. Thus, the goal of brand marketing is to increase awareness of the advertiser's brand to customers. Another goal of online advertisers is to elicit an action or response from a customer. This type of advertising is referred to as direct response advertising. An advertisement displayed on a message, such as a web page, that includes a link to direct a user to the advertiser's web site is an example of a direct response advertisement.

Banner advertisements and sponsored listing advertisements are two types of online advertisements currently in use. In general, a banner advertisement refers to a type of advertisement displayed at a predetermined position of an online message, such as a web page. For example, a banner advertisement may be displayed within a horizontal rectangle at the top of a web page, although banner advertisements appear at any location throughout a web page. A banner advertisement may include graphical images, either animated or static, and/or text. Typically, a banner advertisement includes a URL link such that if a user clicks on the link, the user's browser is redirected to a new location associated with the banner advertisement.

Sponsored listing advertisements refer to advertisements that are displayed in response to a user's search criteria, the page the user is visiting or to the profile of a user. For example, if a user enters a search query in a web based search engine, the search engine may display, in response to the query, hyperlinked text listings for advertisers relevant to the search query. A sponsored listing advertisement may take the form of text and/or images. The behavioral targeting system of the present invention is described in conjunction with online advertising. Although the present invention is described in conjunction with use of banner advertisements and sponsored listing advertisements, any type of advertisement included on a message and distributed over a network may be used without deviating from the spirit or scope of the invention. For example, the present invention has application to match sponsored listings to user behavioral profiles and to webpage content. The teachings of the present invention are applicable to any type of online advertising, including, but not limited to, banner advertisements, sponsored listing advertisements, guaranteed impression advertisements, and performance based advertisements. The advertisements themselves may include any type of media, including text, images, audio or video.

Figure 8:
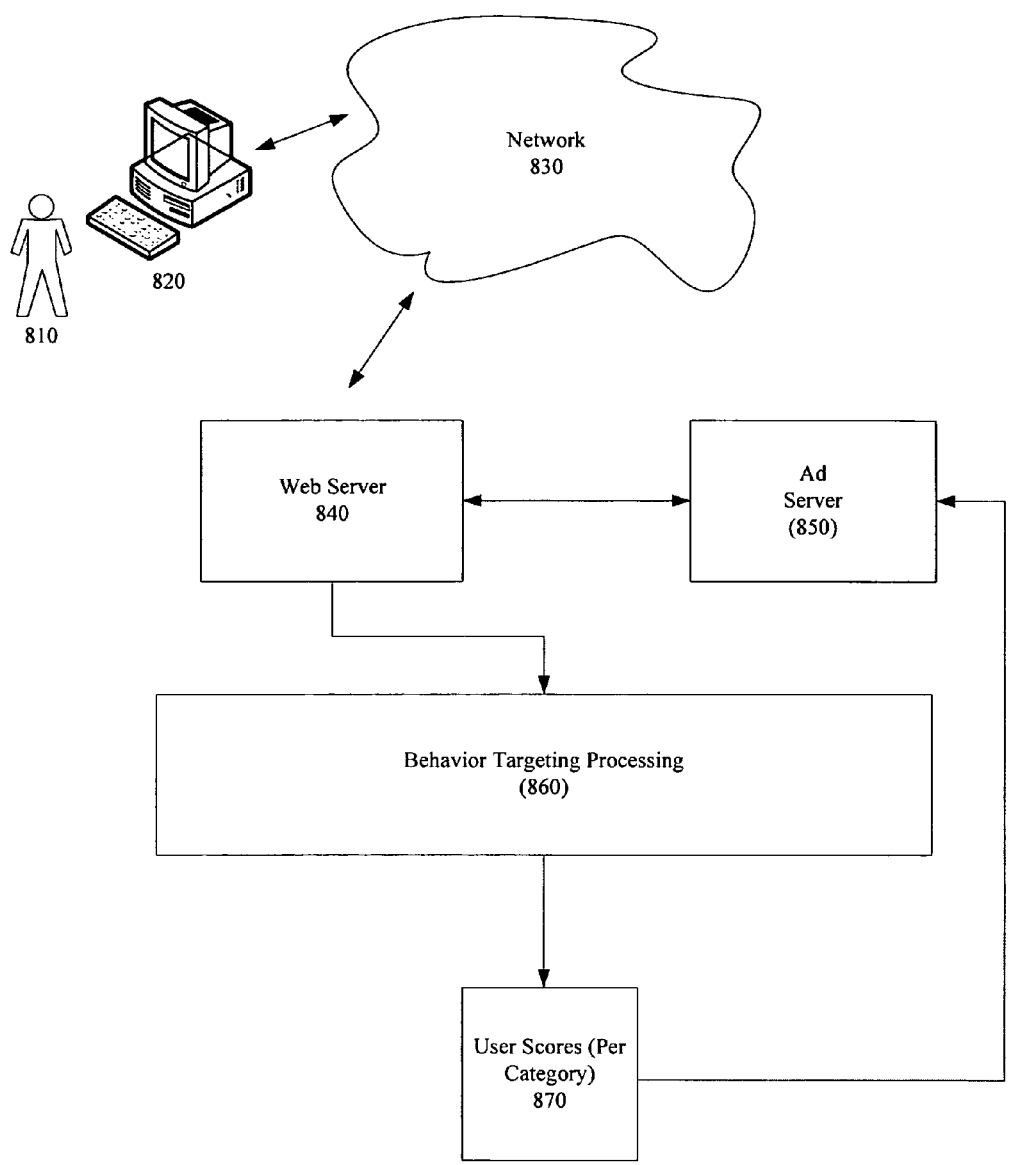
FIG. 8 is a block diagram illustrating one embodiment for serving advertisements using a behavioral targeting system.

FIG. 8 is a block diagram illustrating one embodiment for serving advertisements using a behavioral targeting system. For this example embodiment, the example infrastructure includes network 830, web server 840, advertisement (ad) server 850 as well as computer 820 for user 810. The web server (840) receives information based on user behavior, such as events. The user behavioral information is input to behavioral targeting processing (860). As shown in FIG. 8, behavioral targeting processing 860 generates raw user scores (870), on a category-by-category basis, using the user behavioral information. The user scores are input to the ad server (850), which in turn serves advertisements to web server 840. As a result, customize ads are served to user 810 on computer 820.

Figure 9:
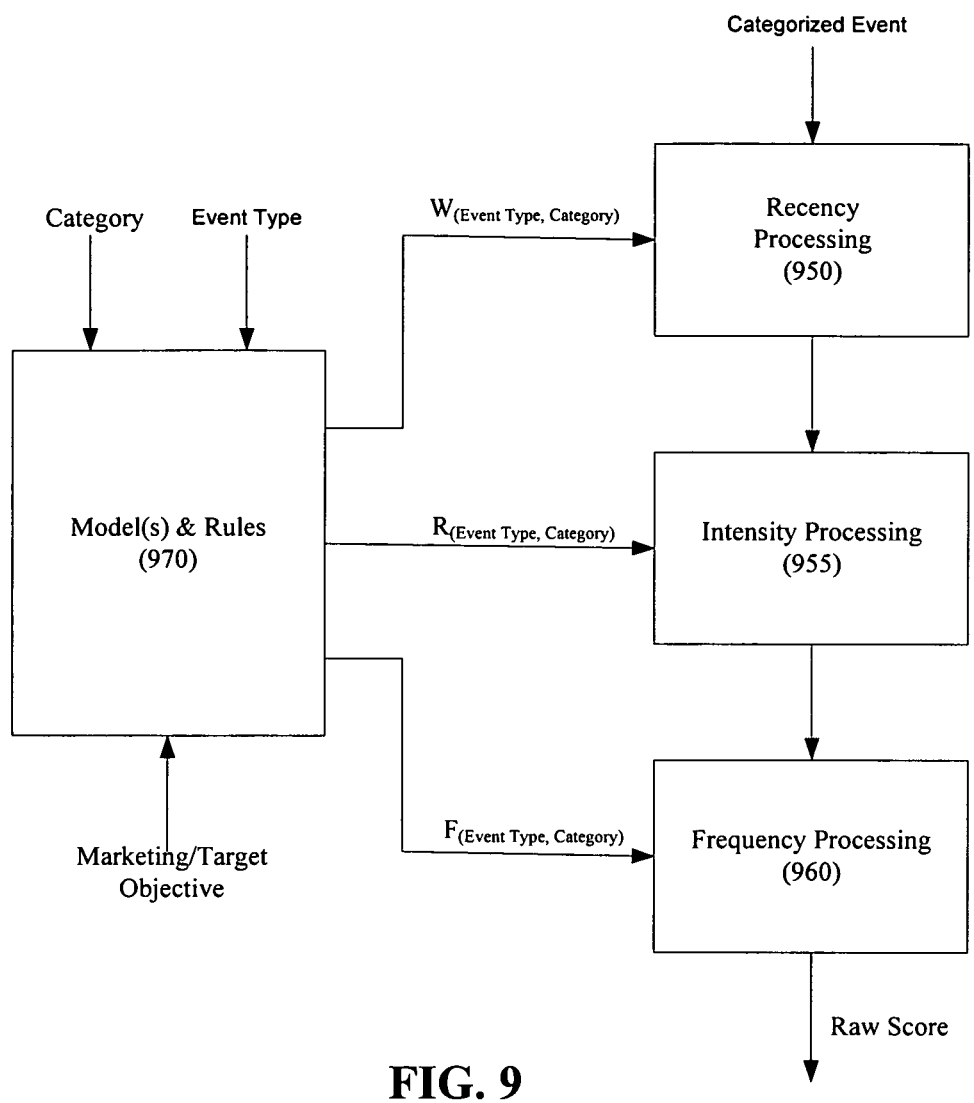
FIG. 9 is a block diagram illustrating one embodiment for dimension processing in the behavioral targeting system.

Dimension Parameters in a Behavior Targeting System:

FIG. 9 is a block diagram illustrating one embodiment for dimension processing in the behavioral targeting system. For this embodiment, dimension processing involves recency processing (950), intensity processing (955) and frequency processing (960). Models and rules (970) receive, category and event type information, and generate, parameters, such as weights, for recency, intensity, and frequency processing modules based on the category and event types. In one embodiment, the models use linear regression. Specific formulas for conducting recently, intensity and frequency processing are described more fully below.

In one embodiment, models and rules (970) comprise a model for each category. Thus, weight parameters for dimension processing are on a per category basis. The model defines weight parameters, including decay parameters. The weight parameters are also specific for event types. In one embodiment, weight parameters for events are not equally weighted. In addition, all events within an event type (e.g., pageview, search, etc.) are not equally weighted. Thus, all weight and decay parameters are not necessarily constant within a category for different event types or across categories for the same event type.

a. Long-Term User Behavioral Profiles:

In one embodiment, the behavioral targeting processing of the present invention generates a long-term user behavioral profile. The long-term user behavioral profile compiles activities of the user over a relatively long period of time (e.g., over at least 24 hours) to generate the user behavioral profile. In one embodiment, the long-term user behavioral profile is used to predict user interests within the next day. For example, the long-term user behavioral profile may be used to determine what ads to serve the user in the next day.

The long-term user behavioral profile has application for use to serve advertisements conducive to a user's long-term interest. For example, a user may show an interest, over a several month period of time, to purchase an automobile. The interest score may be compiled from the user's activities generated by the user learning acquiring information about automobiles online (e.g., page views of automotive site, ad clicks on automotive ads, etc.). For this example, the user's long-term direct response score in the automotive category is high, and therefore an advertising application may serve the user advertisements for the sale of automobiles.

The equation gives the formulation to compute the long-term user interest score for a user at time $t_n$:

$$s_{t_n} = \text{intercept} + \sum_{event} w_{event} \text{Decay}(\{Satu(A_{event,t}) \mid t_0 \le t \le t_n\}) + \sum_{event} r_{event} R_{event,t_n} + \sum_{event} f_{event} F_{event,t_n}$$

wherein:

$s_{t_n}$ represents the long-term direct response (raw) score of a user—click propensity of the user based on her past behavioral data recorded up to time interval $t_n$;

$A_{event,t}$ is the number of activities for event type, event, at day t for a user in a category;

$R_{event,t_n}$ represents recency information of event type, event, for a user based on the most recent day that the user has an activity for the event type in the past;

$r_{event}$ represents the weight of the recency information for event type event that defines how fast the event type "decays" over time w.r.t. prediction power. For example, $r_{Ad\_Click}$ defines how powerful it is to predict ad click propensityy based on the most recent day that a user has an ad click activity;

$w_{event}$ represents the weight of event type event that gives the power of using the intensity information for prediction for ad click propensity;

$F_{event,t_n}$ represents frequency information of event type, event, for a user based on the most recent day that the user has an activity for the event type in the past;

$f_{event}$ represents the weight of the frequency information for event type event.

For each category, the user score $s_{t_n}$ is a linear combination of intensity of event activities $A_{event,t}$ transformed using a saturation function Satu( ) and aggregated using a decay function, Decay( ), and using a recency of event activities $R_{event,t_n}$ in the past. Intensity and recency of event activities are weighted by $w_{event}$ and $r_{event}$ respectively.

Figure 10:
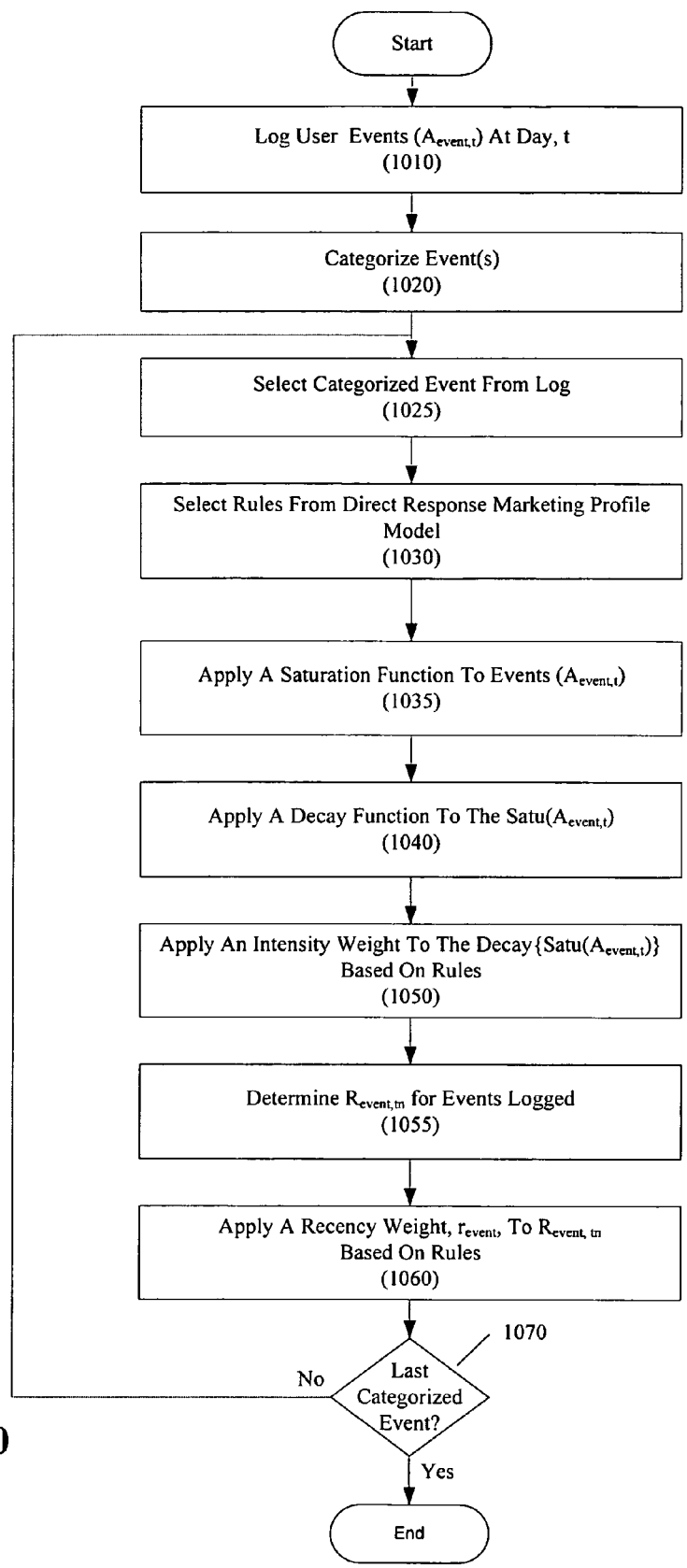
FIG. 10 is a flow diagram illustrating one embodiment for generating a long-term direct response user interest score.

FIG. 10 is a flow diagram illustrating one embodiment for generating a long-term direct response user interest score. For this embodiment, the long-term behavioral targeting system logs user events, $A_{event,t}$, at a specified time interval (FIG. 10, block 1020). In one embodiment, the long-term behavioral targeting system logs events over a 24-hour period. The long-term behavioral targeting system categorizes the events (FIG. 10, block 1020). The long-term behavioral targeting system selects categorized events from the log for processing (FIG. 10, block 1025). A model corresponding to the long-term direct marketing profile is selected. In part, the model includes a plurality of weights for dimension processing (e.g., recency, intensity and frequency).

A saturation function is applied to the events (FIG. 10, block 1035). In one embodiment, the saturation function Satu( ) is applied to all daily event activities. It is a simple upper cap function. $U_{event}$ denotes the upper cap for event type, event. It is the lowest $A_{event,t}$ among top 0.5% heaviest users for the last 7 days.

$$Satu(A_{event,t}) = \begin{cases} A_{event,t} & \text{if } A_{event,t} \le U_{event} \\ U_{event} & \text{otherwise} \end{cases}$$

A decay function is applied to the output of the saturation function (FIG. 10, block 1040). In one embodiment, the decay function, Decay( ), is applied to aggregate a user's daily event activities, and is expressed as:

$$\text{Decay}(\{A_{event,t} \mid t_0 \le t \le t_n\}) = \sum_{t=t_0}^{t_n} \alpha^{t_n - t} A_{event,t} \quad \alpha \in (0, 1]$$

α is a constant for all event types and all categories. The smaller the value of α is, the faster that historical data are phased out. α may be chosen based on system constraints and business requirements. Examples of the decay speed of different values of α are decipited in Table 1 below. In one embodiment, α is set at 0.95.

TABLE 1

|  | Decay | | | | | | |
| --- | --- | --- | --- | --- | --- | --- | --- |
| Day | 0.998 | 0.98 | 0.97 | 0.96 | 0.95 | 0.94 | 0.93 |
| 1 day | 100% | 98% | 97% | 96% | 95% | 94% | 93% |
| 2 day | 100% | 96% | 94% | 92% | 90% | 88% | 86% |
| 3 day | 99% | 94% | 91% | 88% | 86% | 83% | 80% |
| 4 day | 99% | 92% | 89% | 85% | 81% | 78% | 75% |
| 5 day | 99% | 90% | 86% | 82% | 77% | 73% | 70% |
| 6 day | 99% | 89% | 83% | 78% | 74% | 69% | 65% |
| 1 week | 99% | 87% | 81% | 75% | 70% | 65% | 60% |
| 1 mon | 95% | 57% | 43% | 32% | 24% | 18% | 13% |
| 2 mon | 89% | 32% | 18% | 10% | 6% | 3% | 2% |
| 3 mon | 85% | 18% | 8% | 3% | 1% | 1% | 0% |

Thereafter, an intensity weight is applied to the output of the decay function (FIG. 10, block 1050). In one embodiment, the weights for the saturated intensity features $w_{event}$ are fit by modeling (e.g., regression analysis). The weights, along with standard errors and performance metrics, are output by the modeling system.

A recency parameter is generated for the logged events (FIG. 10, block 1055). $R_{event,t_n}$ is the most recent day that a user has an activity of type event in the category among the user's activites up to time, $t_n$. For example, if the last pageview for the user in Automobile cateogry—among all pageviews activities loaded up to $t_n$—happened 2 days ago, then the recency for the user in pageview for Automobile is 2. If no pageview activities are recorded for the user, recency is set to $R_{UNKNOWN}$, a constant. In one embodiment, $R_{UNKNOWN}$ is set to 90 days.

$$R_{event,t_n} = \begin{cases} t_{current} - \max\{t \mid A_{event,t} > 0, t_0 \le t \le t_n\} & \text{if} \quad \exists A_{event,t} > 0 \\ R_{unknown} & \text{otherwise} \end{cases}$$

Next, a recency weight, $r_{event}$, based on the event type and category of the event, is applied to the recency function (FIG. 10, block 1060). In one embodiment, the weights for the saturated intensity features $r_{event}$ are fit by modeling, such as regression analysis. The weights, along with standard errors and performance metrics, are output by the modeling system.

As shown in a loop in FIG. 10, the behavioral targeting system processes events for each category by executing blocks 1025, 1030, 1035, 1040, 1050, 1055 and 1060.

In one embodiment, the expression for generating long-term user interest scores may be simplified. Let $I_{t_n}$ denote the intensity dimension of a user's activities across all event types from day $t_0$ to $t_n$. If α is the same across all event types, we have $$I_{t_n} = \sum_{t=t_0}^{t_n} \alpha^{t_n - t} \sum_{event} w_{event} Satu(A_{event,t})$$

Then the user score for the user u with activities recorded up to $t_n$ can be re-written as:

$$s_{t_n} = I_{t_n} + \sum_{event} r_{event} R_{event,t_n}$$

In some embodiments, a long term score of a user for a particular category may be updated incrementally without storing daily scores for the user in the particular category. Therefore, the score may be updated over time (at predetermined update intervals) to reflect the user's past category interests since the first day of user scoring without having to re-process all the prior events and calculations used to calculate the original score.

If it is assumed that $t_k$ denotes the day that event activities were last recorded for the user and the incremental update interval is every d days, then $t_n = t_k + d$. For example, for a daily incremental update, $t_n = t_k + 1$. In some embodiments, the updated score $s_{t_n}$ can then be determined using the following equation:

$$s_{t_n} = \sum_{t=t_k+1}^{t_n} \alpha^{t_n - t} \sum_{event} w_{event} Satu(A_{event,t}) + \alpha^{t_n - t_k} I_{t_k} + \sum_{event} r_{event} R_{event,t_n}$$

$$R_{event,t_n} = \begin{cases} t_n - \max\{t \mid A_{event,t} > 0, t_k < t \le t_n\} & \text{if} \quad \exists A_{event,t} > 0, t_k < t \le t_n \\ R_{event,t_k} + t_n - t_k & \text{otherwise} \end{cases}$$

b. Short-Term User Behavioral Profiles:

In another embodiment, the behavioral targeting system generates a short-term direct response user behavioral profile. In one embodiment, the short-term user behavioral profile is used to serve an advertisement to the user within the next hour. The short-term user behavioral profile has application for use to serve advertisements conducive to a user's very near term purchasing intentions. For example, a user may show an interest, over the last few minutes, to purchase flowers online. Typically a small purchase, such as flowers, is typically made by a purchase in a relatively short period of time. For this example, the behavioral targeting system accumulates user activity, in real-time, and serves ads to users in a short period of time.

The following equation gives the formulation for a short-term direct response score for a user at an hourly interval, $t_n$:

$$s_{t_n} = \text{intercept} + \sum_{event} w_{event} \text{Decay}(\{Satu(A_{event,t}) \mid t_0 \le t \le t_n\}) + rR_{t_n} + r'(R')_{t_n}$$

wherein:

$s_{t_n}$ represents the short-term direct response (raw) score of a user at an hourly interval that measures the click propensity of the user based on past behavioral data that was updated at $t_n$;

$A_{event,t}$ is the number of activities for event type, event, at an hourly interval, t, for a user in a category;

$R_{t_n}$ represents recency information for a user based on a daily interval that the user has an activity, excluding ad category view event types;

$R'_{t_n}$ represents recency information for a user based on hourly intra-day pattern that the user has an activity, excluding ad category view event types r,r' represents the weight of the recency information that defines how fast activities "decay" over time w.r.t. prediction power. For example, $r_{Ad\_Click}$ defines how powerful it is to predict future ad click based on the most recent time interval that a user has a click activity in the past; and $w_{event}$ represents the weight of event type event that gives the power of using the intensity information for prediction for ad click propensity.

For each category, the user score $s_{t_n}$ is a linear combination of intensity of activities $A_{event,t}$ (transformed using a saturation function Satu( ), and aggregated using a decay function Decay( )) and recency of activities $R_{t_n}, R'_{t_n}$. Intensity and recency of activities are weighted by $w_{event}$, r, r' respectively.

Figure 11:
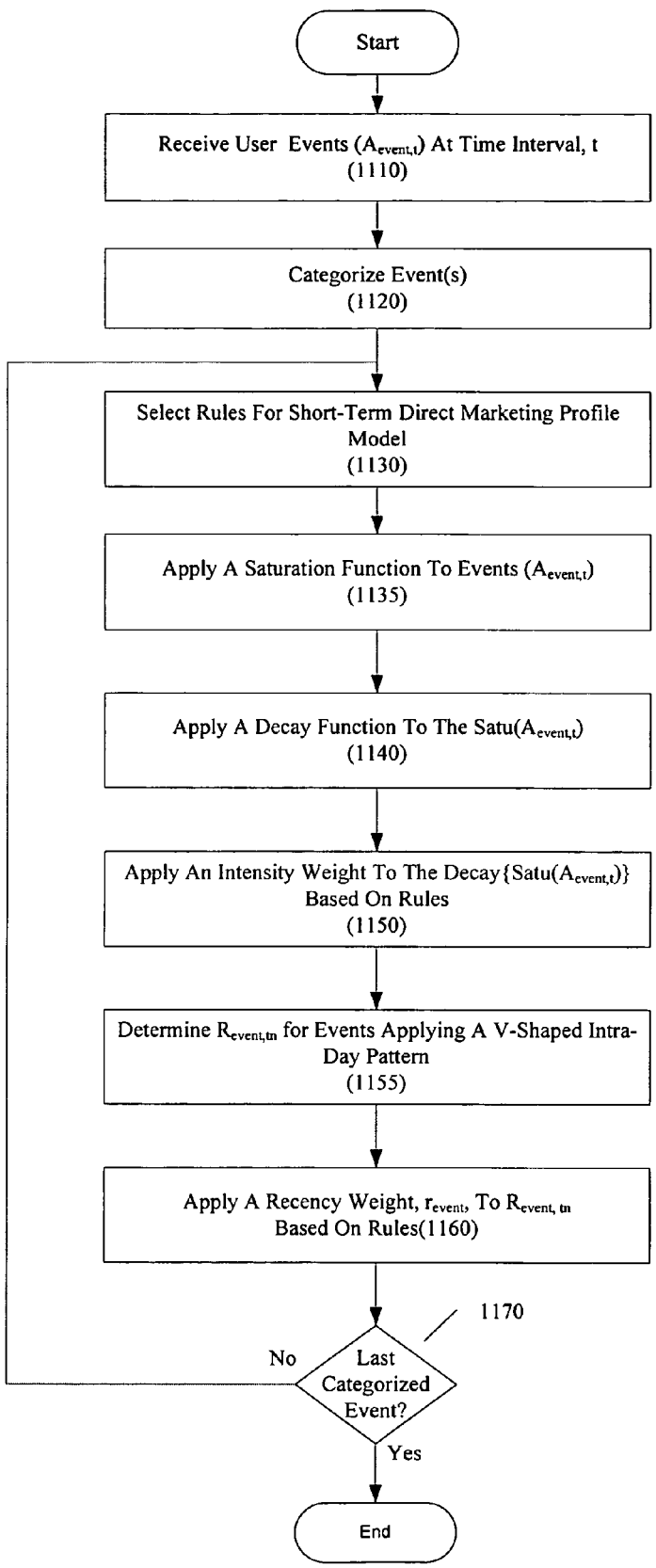
FIG. 11 is a flow diagram illustrating one embodiment for generating a short-term direct response user interest score.

FIG. 11 is a flow diagram illustrating one embodiment for generating a short-term direct response user interest score. For this embodiment, the short-term behavioral targeting receives, in real-time, user events, $A_{event,t}$, at a specified time interval (FIG. 11, block 1110). The short-term behavioral targeting system categorizes the events (FIG. 11, block 1120). A model, corresponding to the short-term direct marketing/user objective, is selected (FIG. 11, block 1130). In part, the model includes a plurality of weights for dimension processing (e.g., recency, intensity and frequency).

A saturation function is applied to the events (FIG. 11, block 1135). In one embodiment, the saturation function Satu( ) is applied to all hourly event activities. It is a simple upper cap function. $U_{event}$ denotes the upper cap for event type, event. It is the lowest $A_{event,t}$ among top 0.5% heaviest users during an hourly interval.

$$Satu(A_{event,t}) = \begin{cases} A_{event,t} & \text{if } A_{event,t} \leq U_{event} \\ U_{event} & \text{otherwise} \end{cases}$$

A decay function is applied to the output of the saturation function (FIG. 11, block 1140). In one embodiment, the decay function, Decay( ), is applied to aggregate a user's event activities, over time, and is expressed as:

$$Decay(\{A_{event,t} \mid t_0 \leq t \leq t_n\}) = \sum_{t=t_0}^{t_n} \alpha^{t_n-t} A_{event,t} \quad \alpha \in (0,1]$$

α is a constant for all event types and all categories. The smaller the value of α is, the faster that historical data are phased out. α may be chosen based on system constraints and business requirements. Examples of the hourly and daily decay speed of different values of α are decipited in Table 2 below. In one embodiment, α is set at 0.998.

TABLE 2

| Hour | Decay | | | | | | |
|---|---|---|---|---|---|---|---|
| | 0.999 | 0.998 | 0.997 | 0.996 | 0.970 | 0.960 | 0.950 |
| 1 hr | 100% | 100% | 100% | 100% | 97% | 96% | 95% |
| 12 hr | 99% | 98% | 96% | 95% | 69% | 61% | 54% |
| 1 day | 98% | 95% | 93% | 91% | 48% | 38% | 29% |
| 2 day | 95% | 91% | 87% | 82% | 23% | 14% | 9% |
| 3 day | 93% | 87% | 81% | 75% | 11% | 5% | 2% |
| 4 day | 91% | 83% | 75% | 68% | 5% | 2% | 1% |
| 5 day | 89% | 79% | 70% | 62% | 3% | 1% | 0% |
| 6 day | 87% | 75% | 65% | 56% | 1% | 0% | 0% |
| 1 week | 85% | 71% | 60% | 51% | 1% | 0% | 0% |
| 2 week | 71% | 51% | 36% | 26% | 0% | 0% | 0% |
| 3 week | 60% | 36% | 22% | 13% | 0% | 0% | 0% |
| 1 mon | 51% | 26% | 13% | 7% | 0% | 0% | 0% |
| 2 mon | 26% | 7% | 2% | 0% | 0% | 0% | 0% |
| 3 mon | 13% | 2% | 0% | 0% | 0% | 0% | 0% |

| Day | Decay | | | | | | |
|---|---|---|---|---|---|---|---|
| | 0.998 | 0.98 | 0.97 | 0.96 | 0.95 | 0.94 | 0.93 |
| 1 day | 100% | 98% | 97% | 96% | 95% | 94% | 93% |
| 2 day | 100% | 96% | 94% | 92% | 90% | 88% | 86% |
| 3 day | 99% | 94% | 91% | 88% | 86% | 83% | 80% |
| 4 day | 99% | 92% | 89% | 85% | 81% | 78% | 75% |
| 5 day | 99% | 90% | 86% | 82% | 77% | 73% | 70% |
| 6 day | 99% | 89% | 83% | 78% | 74% | 69% | 65% |
| 1 week | 99% | 87% | 81% | 75% | 70% | 65% | 60% |
| 1 mon | 95% | 57% | 43% | 32% | 24% | 18% | 13% |
| 2 mon | 89% | 32% | 18% | 10% | 6% | 3% | 2% |
| 3 mon | 85% | 18% | 8% | 3% | 1% | 1% | 0% |

Thereafter, an intensity weight is applied to the output of the decay function (FIG. 11, block 1150). In one embodiment, the weights for the saturated intensity features $w_{event}$ are fit by statistical modeling. The weights, along with standard errors and performance metrics, are output by the modeling system.

A recency parameter is generated for the events (FIG. 11, block 1155). In one embodiment, for simplicity purposes, a single recency value is used. $R_{t_n}$ is the most recent hourly interval that a user has activity in the category among the user's activites last updated at, $t_n$. For example, if the user had a pageview in Automobile cateogry two hours before and there are no other activities within the two hours, then the recency for the user in pageview for Automobile is 2. If the user has no activities since the last update, recency, $R_{t_n}$, is set to $R_{UNKNOWN}$, a constant. In one embodiment, $R_{UNKNOWN}$ is set to 504.

$$R_{t_n} = \begin{cases} t_{current} - \max\{t \mid A_{event,t} > 0, t_0 \leq t \leq t_n\} & \text{if } \exists A_{event,t} > 0 \cap event \neq adcat\_views \\ R_{unknown} & \text{otherwise} \end{cases}$$

$R'_{t_n}$ is derived from $R_{t_n}$ that transforms $R_{t_n}$ into a V-shaped intra-day pattern:

$$R'_{t_n} = \begin{cases} |R_{t_n} \bmod 24 - 12| + 1 & R_{t_n} \neq R_{unknown} \\ 0 & \text{otherwise} \end{cases}$$

Next, recency features, r, r' based on the event type and category of the event, is applied to the recency function (FIG. 11, block 1160). In one embodiment, the weights for the intensity features r, r' are fit by modeling. The weights, along with standard errors and performance metrics, are output by the modeling system.

As shown in a loop in FIG. 11, the behavioral targeting system processes events for each category by executing blocks 1130, 1135, 1140, 1150, 1160 and 1170.

A short term score of a user for a particular category can also be updated incrementally in real-time. The real-time incremental update of a score can be performed without determining or storing a count of event activities $A_{event,t}$ (the number of activities for event type event at hourly interval t) for the user in the particular category. The real-time incremental update of a score allows for the adjustment of a score based on a recent event (of event type event) without having to re-process all the prior events and calculations used to calculate the original score.

As discussed above, $I_{t_n}$ denotes the intensity component of a score (i.e., the intensity dimension of a user's activities across all event types from day $t_0$ to $t_n$) where:

$$I_{t_n} = \sum_{t=t_0}^{t_n} \alpha^{t_n - t} \sum_{event} w_{event} Satu(A_{event,t})$$

Also as discussed above, a score for a user with all activities recorded up to t can be simplified as:

$$s_{t_n} = I_{t_n} + \sum_{event} r_{event} R_{event,t_n}$$

If the intensity component is initialized to zero ($I_{t_0}=0$) and the hourly interval of the last user activity is set to unknown ($R_{t_0}=R_{unknown}$), then an intial user score $s_{t_0}$ is computed as $s_{t_0}=R_{UNKNOWN}$. Also, assume that $s_{t_{n-1}}$ denotes a user score that was last updated at hourly interval $t_{n-1}$. When a recent activity of an event type event is received at hourly interval $t_n$, the user score $s_{t_{n-1}}$ may be incrementally updated to user score $s_{t_n}$ without re-processing all past event activities $A_{event,t}$ for the user in the particular category. In some embodiments, the incrementally updated user score $s_{t_n}$ is determined using the following equation:

$$s_{t_n} = \alpha^{t_n - t_{n-1}} I_{t_{n-1}} + w_{event} + rR_{t_n} + r' R'_{t_n}$$

$$R_{t_n} = \begin{cases} R_{t_{n-1}} & \text{if event = adcat\_views} \\ R_{t_{n-1}} - t_n + t_{n-1} & \text{otherwise} \end{cases}$$

$$R'_{t_n} = \begin{cases} |R_{t_n} \bmod 24 - 12| + 1 & R_{t_n} \neq R_{unknown} \\ 0 & \text{otherwise} \end{cases}$$

Modeling Process:

As discussed above, the models comprise weight parameters for applying weights to generate user profile scores. In one embodiment, the weight parameters are generated from a user data set. The user data set, compiled from user activity in the past, correlates event information with user behavior (e.g., click through rate correlated with user events). The user data set may be analyzed to identify positive users (e.g., users activity meets the target objective) and negative users (e.g., users that do not meet the target objective). The user data set is analyzed, using data mining techniques, to determine what actions (e.g., event information) are most useful in predicting behavior for a target objective. Event information for positive users may be analyzed to determine events that most contribute to the target objective. For example, if the target objective is direct response advertising and the user data set identifies a trend regarding user's that submit search queries categorized in the "Sports" category also click on direct response advertisements, then a weight parameter for the event type, search, is given a relatively high value for the category, "Sports." For this embodiment, the user data set is analyzed to generate weights for each event type in each category of the taxonomy.

One problem associated with this approach to generating models is that there may be insufficient or no data associated with a category. In one embodiment, the behavioral targeting system utilizes a model inheritance technique for categories that have insufficient data sets. Using a model inheritance technique, a model created from one category is used as the model for a related or parent category on the taxonomy. For example, a taxonomy may include the child category, "Equity_Investments" located under the parent category "Finance" in the taxonomy. If the user data set is insufficient for the category "Equity_Investments", the model for the "Finance" category may be used as the model for the "Equity_Investments" category. The model inheritance technique may also be used to facilitate the process of building models in a system that supports a large number of categories by generating some models and then using those models for related categories.

In one embodiment, the modeling process uses user weights to increase the accuracy of the models. In general, user weights identify those users in the user data set that provide the highest quality of information to build the models. An example user data set may include the following:

TABLE 3

| User | Ad Views | Ad Clicks |
|------|----------|-----------|
| John | 100 | 0 |
| Mary | 1 | 0 |
| Peter | 100 | 1 |
| Sue | 1 | 1 |

This example data set indicates that John and Mary are negative users and Peter and Sue are positive users with regard to propensity to click. However, Mary has only seen the ad view a single time while John has seen the ad view 100 times. Thus, the data provides a higher level of confidence that John is a non-clicker than Mary. Similarly, Sue, who has only seen the ad view one time has clicked, while Peter was exposed to the ad view 100 times before he clicked. Thus, the confidence of the data of Sue as a clicker is higher than the confidence that Peter is a clicker. In one embodiment for generating a model, a user weight is ascribed to the data from a user data set to measure the quality of the data. For the above example, when generating a model, the data associated with Sue is assigned a higher user weight than the data associated with Peter.

In one embodiment, user weights are assigned to users based on the users' expected performance with regard to the target objective (e.g., CTR). The target variable, used in the data mining algorithm, is re-adjusted, and the weights of positive and negative users are normalized to sum to 1. Specifically, the target variable, $t_u$, may be set to 1 or 0 as follows:

$$t_u=1$$

if$(adclick-\overline{CTR}*f(adview))>0$ otherwise, $$t_u=0$$

In one embodiment, $f(adview)=adview+k$ (wherein k is a constant).

In other embodiments, $$f(adview)=adview$$

$$f(adview)=(1-e^{-k*adview})$$

$$f(adview)=bin(adview)$$

The user weighting is then calculated as:

$$u_u=|adclick-\overline{CTR}*f(adview)|$$

Using the target variable and the user weight, a machine learning algorithm minimizes error in predictions in accordance with the following relationship:

$$error = \sum_u (t_u - \tilde{t}_u)^2 * u_u$$

wherein, $t_u$ is the predictive target variable and $\tilde{t}_u$ is the actual target variable.

In one embodiment, a data cleansing technique is used to eliminate user data from the user data set. For this embodiment, "robot" events are excluded prior to the modeling process to ensure their behavior does not bias the model. A robot event throws off modeling particularly if there is any scoring relative to other users. Thus, robot events and cookies with minimum activity are excluded from the model.

Figure 12:
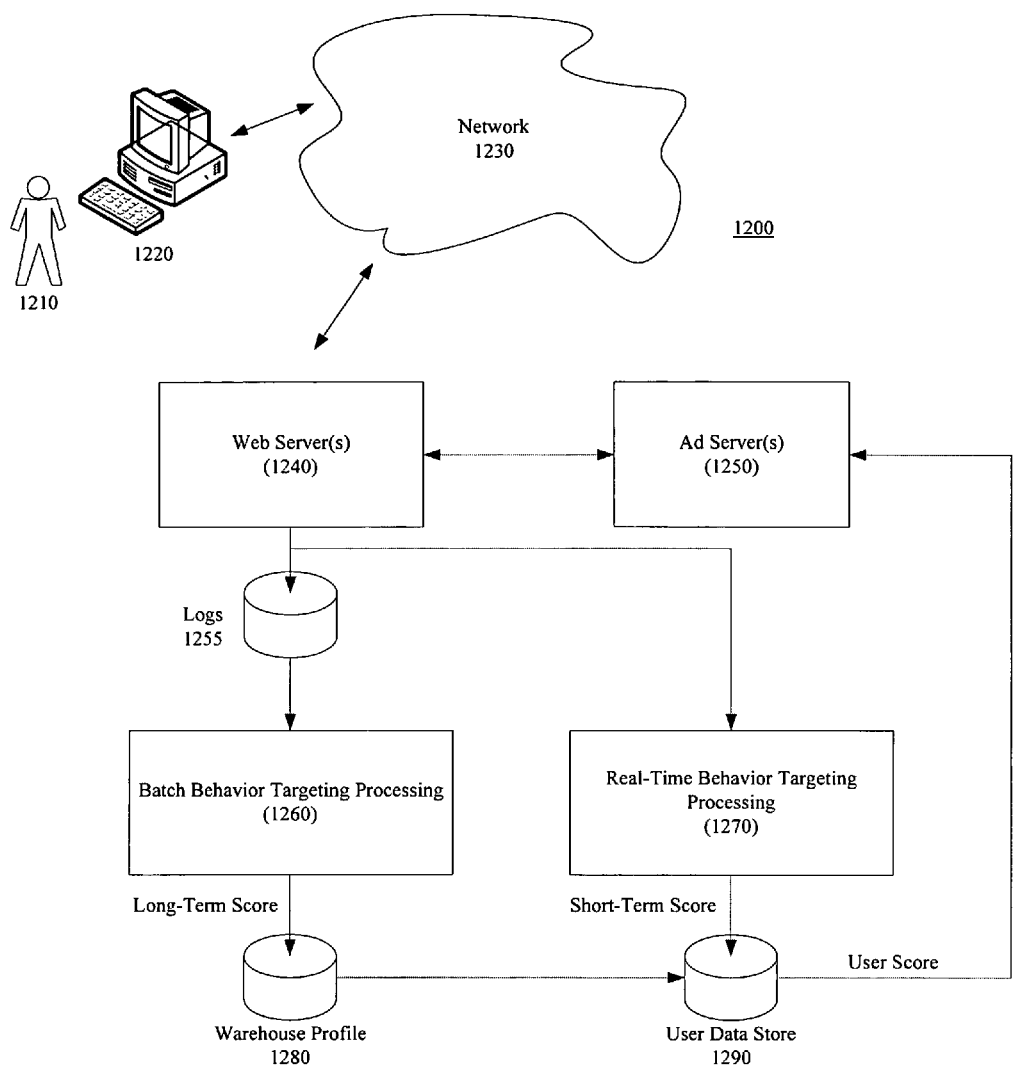
FIG. 12 is a block diagram illustrating one embodiment for a behavioral targeting system that generates long-term and short-term user interest scores.

Real Time & Batch Processing Implementation:

FIG. 12 is a block diagram illustrating one embodiment for a behavioral targeting system that generates long-term and short-term user interest scores. Similar to the infrastructure described above, an exemplary user computer (1220), network 1230, web server 1240, ad server 1250 are used. In one embodiment, a database 1255, batch behavioral targeting processing 1260 and warehouse profile 1280 are used to calculate a long-term user interest score. The database 1255 is coupled to web server(s) 1240 to store events logged. The logged events are then processed, at a predetermined interval, in batch behavioral targeting processing 1260. The output of batch behavioral targeting processing 1260 comprises a plurality of user interest scores, per category. The scores are stored in warehouse profile 1280.

The behavioral targeting system 1200 also comprises real-time behavior targeting processing 1270 and user data store 1290 to generate short-term user interest scores. Specifically, events are accumulated in real-time behavior targeting processing 1270 for a short-term time interval, such as one hour. The real-time behavioral targeting processing 1270 generates short-term user interest scores. As described above, the short-term user interest scores may be used to select ads for various user and marketing objectives. In another embodiment, the user data store comprises both the long-term and short-term user interest scores. For this embodiment, the behavioral targeting system 1200 generates a combine long-term and short-term user interest score, as described below.

Mapping User Scores to Output Metrics:

For some applications, the range of user profile scores is converted to relative scores across categories (i.e., relative to other user profile scores in different categories). In one embodiment, the user profile scores are percentage ranked in each category. For example, a user profile score of "0.2" in the Finance category may yield a user profile score within the top 1% for all users, and a user profile score of "0.6" in the Sports category may yield a user profile score within the top 10% for all users. For this example, the user profile score of "0.6" in Sports is converted to a relative user profile score of 10, and the user profile score of "0.2" in Finance is converted to a relative user profile score of 1. Using this technique, the relative user profile scores permit comparing the user's interests in "Sports" and "Finance" relative to different users' other interests. In another embodiment, a category is selected to maximize ROI on a user by ranking scores of the user across all categories using an output metric, such as click through rate.

In another embodiment, the user profiles may be segmented into tiers. For example, a marketer may desire to launch a program using only the top 10% of users in a specified category. Then, the next 10% of users may be ranked for another purpose. The ranking of users may be based on any categorization of the user data for any purpose.

As discussed above, raw scores for target objectives are produced. For example, a branding score may be produced by the branding model/rule set, and a direct response score may be produced by the direct response model/rule set. A raw score may be produced using long-term or short-term data. A raw score produced by long-term data is referred to as a long-term raw score, and a raw score produced by short-term is referred to as a short-term raw score. For example, a direct response score may be produced using long-term data and short-term data.

Raw scores indicate a relative interest measure of a user in a category for a target objective. However, the raw scores do not directly measure the propensity of a user's action. As such, raw scores are converted or mapped to more useful scores, referred to herein as mapped scores, for target optimization purposes. In some embodiments, mapped scores are behavior-orientated scores that reflect user tendencies for a particular action. Mapped scores are useful for target optimization purposes as they provide predictive information regarding a user's action relative to categories of interest.

Some examples of mapped scores are click propensity, expressed as a percentage, click-through-rate, and conversion propensity, also expressed as a rate. In other embodiments, other mapped scores may also be produced. In general, the click-through-rate (CTR) of a user for a category reflects the probability that the user will select ("click on") content (e.g., advertisement, link, etc.) associated with the category. In general, the conversion rate for a user in a category reflects the probability that the user will buy/purchase a product or service associated with the category. In some embodiments, for a particular type of raw score, long-term and short-term raw scores are converted to long-term and short-term mapped scores. For example, a long-term direct response score (LTDR) may be converted to a long-term CTR score (LTCTR), and a short-term direct response score (STDR) may be converted to a short-term CTR score (STCTR).

Figure 13:
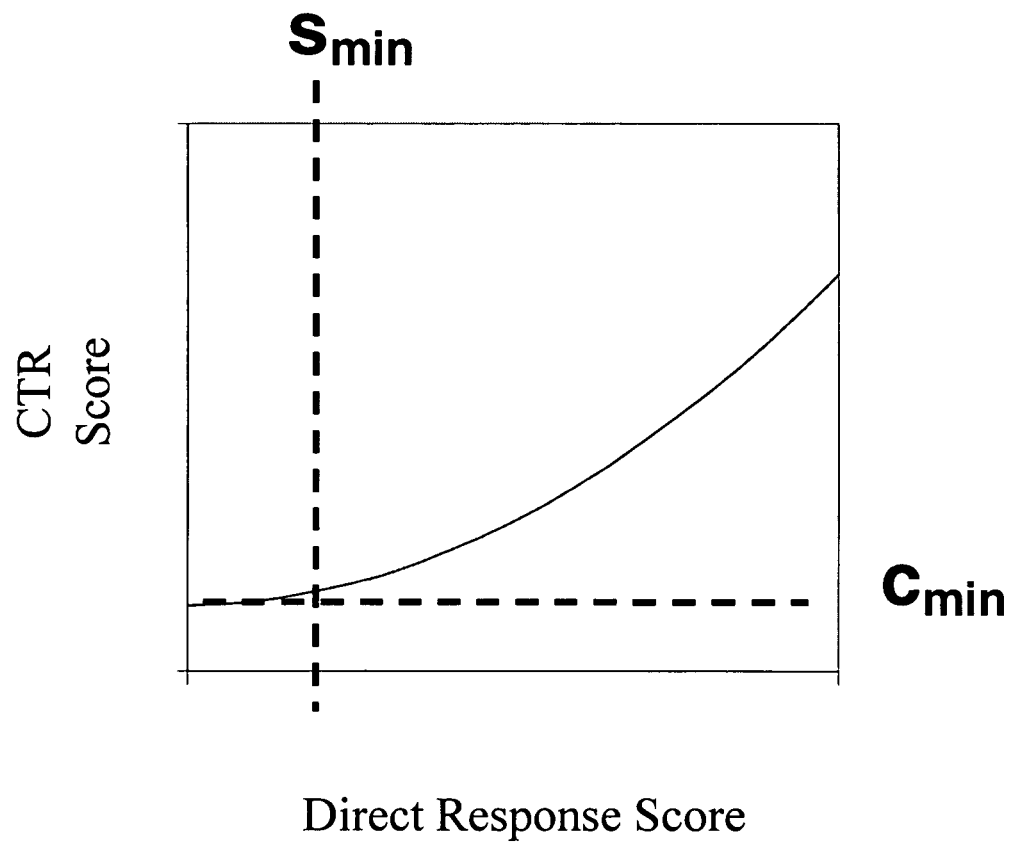
FIG. 13 illustrates a graph that shows CTR scores as a function of direct response scores based on statistical data aggregated from a plurality of users.

For the same user and category, a raw score typically does not have a linear relationship with a mapped score. For example, based on statistical behavior data aggregated from a plurality of users, users' direct response scores do not have a linear relationship with their CTR scores in the same categories. FIG. 13 illustrates a graph that shows CTR scores as a function of direct response scores based on statistical data aggregated from a plurality of users. As shown in FIG. 13, CTR scores, shown on the y-axis, increase nonlinearly as the direct response scores, shown on the x-axis, increase. The direct response and CTR scores are bounded with the lower bound of $s_{min}$ and $c_{min}$, respectively, wherein $s_{min}$ indicates the direct response score of inactive users with $c_{min}$ as its corresponding CTR score.

In some embodiments, a raw score is converted to a mapped score using a nonlinear polynomial mapping equation. The mapping equation may be determined using statistical behavior data aggregated from a plurality of users that correlates mapped scores with raw scores. In some embodiments, this mapping equation is represented as:

$$\text{RawScoreToMappedScore}(s_s) = c_{min} + k_1(s_s - s_{min}) + k_2(s_s - s_{min})^2 = c_s$$

wherein:
  $s_s$=raw score value;
  $s_{min}$=the score of users who did not exhibit any activities (pageviews, searches, clicks, etc.) in the past in a category;
  $c_{min}$=click through rate score that corresponds to $S_{min}$. Note, $c_{min} > 0$ because even users that do not show behavioral interest in the past may still have a non-zero propensity to click;
  $k_1$ and $k_2$=constants; and
  $c_s$=mapped score value.

In some embodiments, the values for constants used in the mapping equation ($S_{min}$, $c_{min}$, $k_1$ and $k_2$) vary depending on the type of raw score to be mapped. In these embodiments, the particular model/rule set used to produce the raw score computes and stores these constant values that are then used in the mapping equation. For example, the constant values used for converting branding scores to mapped scores may be different than the constant values used for converting direct response scores to mapped scores. The constant values for the branding scores may be computed and stored in the branding model/rule set, and the constant values for the direct response scores may be computed and stored in the branding model/rule set. In some embodiments, the values for the constants used in the mapping equation (e.g., $s_{min}$, $c_{min}$, $k_1$ and $k_2$) vary depending on the type of mapped scores. For example, the constant values used to produce CTR scores may be different than the constant values used to produce conversion rate scores.

As stated above, for a type of raw score (e.g., direct response score) there may be a long-term and a short-term raw score (e.g., LTDR and STDR). For this embodiment, the long-term raw score (e.g., LTDR) may be converted to a long-term mapped score (e.g., LTCTR), and the short-term raw score (e.g., STDR) may be converted to a short-term mapped score (e.g., STCTR). These long-term and short-term mapped scores are combined into a single combined mapped score. In some embodiments, the combined mapped score is calculated using a combining equation determined using statistical behavior data aggregated from a plurality of users. In some embodiments, the combining equation is represented as:

$$\text{CombinedMappedScore}(c_{st}, c_{lt}) = (c_{st} * c_{sl})/(EMS) = c_c$$

wherein:
  $c_{st}$=short term mapped score value;
  $c_{sl}$=long term mapped score value;
  EMS=expected mapped score among a plurality of users; and
  $c_c$=combined mapped score value.

The EMS value may be determined using statistical behavior data aggregated from a plurality of users. In some embodiments, the EMS value is constant within a particular category but varies between different categories. As an example, if the long and short term mapped scores are long and short-term CTR scores, the combining equation is represented as:

$$\text{CombinedCTRScore}(c_{st}, c_{lt}) = (c_{st} * c_{sl})/(ECTR) = c_c$$

wherein:
  $c_{st}$=short term CTR propensity;
  $c_{sl}$=long term CTR propensity;
  ECTR=expected CTR among a plurality of users; and
  $c_c$=combined CTR propensity.

As such, when long-term and short-term mapped scores are produced, the combining equation may be used to provide a single combined mapped score that reflects the long-term and short-term mapped scores. The single combined mapped may be used for later target optimization processing.

The process to combine long-term and short-term scores is incremental. This technique permits combining long-term and short-term scores without re-processing event information associated with the long-term score. This results in substantial saving, both processing and time, because a substantial amount of time may be needed to process large amounts of event information. Therefore, event information, compiled to generate a long-term user profile score, may be used at a later time by combining the long-term user profile score with short-term user profile scores. For example, event information may be calculated as a long-term user profile score at a time, $time_0$. A day later, $time_0$ plus a day, a short-term user profile score may be calculated for the past day. Two days after $time_0$, $time_0$ plus two days, a second short-term score may be calculated in real-time. For this example, the behavioral targeting system may re-calculate a new long-term score for combination with the new short-term score at $time_0$ plus two days without re-processing the event information.

As discussed above, in one embodiment, the intensity dimension comprises a decay function. In general, the intensity parameter decays the event information weighting based on the amount of time elapsed. In one embodiment for an incremental long-term and short-term score combination process, a new long-term score is generated by increasing the decay function by the amount of time lapsed between calculation of the long-term score and the present time for generating a new long-term score. The recency dimension may also be updated incrementally. In one embodiment, the recency parameter is a linear function with time such that the recency parameter is increased a fixed amount per unit of time (e.g., the recency parameter may be incremented 1 point for each day). Thus, a new recency parameter, associated with a long-term score, may be generated by increasing the recency parameter to coincide with a new time (i.e., the between the calculation of the long-term score and the current time).

The combination of long-term and short-term scores provides for a more accurate behavioral targeting system. The long-term scores capture comprehensive behavior data. However, long-term scores have a relatively long lag time (e.g., a day) with regard to current behavioral interests. Short-term data captures behavior data in real-time, and therefore captures the user's current behavioral interests. However, unlike long-term scores, short-term scores do not capture an entire profile of a user's behavior. Thus, by combining the long-term and the short-term scores, the user behavioral profiles capture both the current interests as well as the past interests to provide a comprehensive view of a user's interest.

Figure 14:
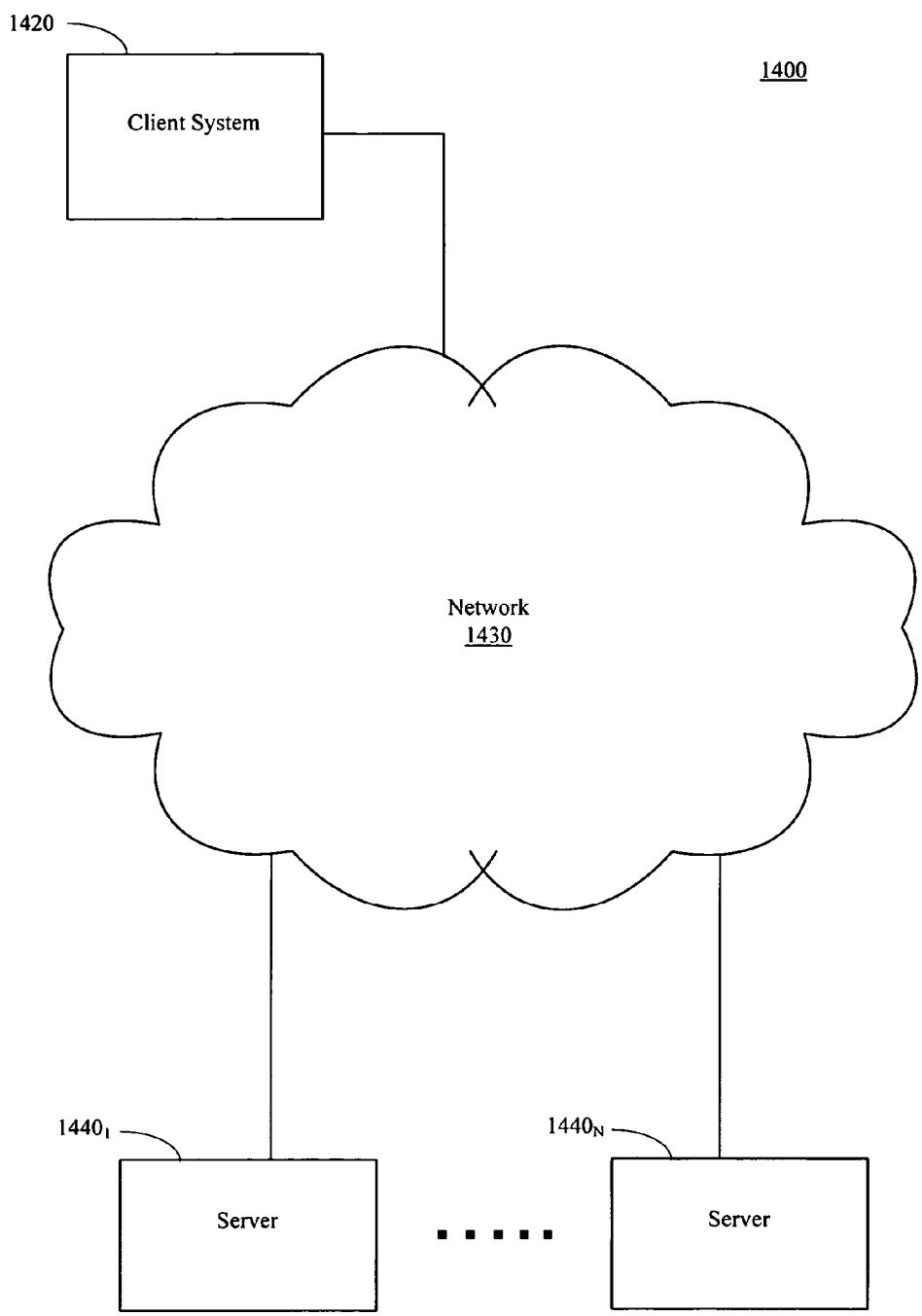
FIG. 14 illustrates one embodiment of a network environment for operation of the behavioral targeting system of the present invention.

Network Environment for A Behavioral Targeting System:

FIG. 14 illustrates one embodiment of a network environment 1400 for operation of the behavioral targeting system of the present invention. The network environment 1400 includes a client system 1420 coupled to a network 1430 (such as the Internet, an intranet, an extranet, a virtual private network, a non-TCP/IP based network, any LAN or WAN, or the like) and server systems $1440_1$ to $1440_N$. A server system may include a single server computer or a number of server computers. The client system 1420 is configured to communicate with any of server systems $1440_1$ to $1440_N$, for example, to request and receive base content and additional content (e.g., in the form of a web page).

The client system 1420 may include a desktop personal computer, workstation, laptop, PDA, cell phone, any wireless application protocol (WAP) enabled device, or any other device capable of communicating directly or indirectly to a network. The client system 1420 typically runs a web browsing program that allows a user of the client system 1420 to request and receive content from server systems $1440_1$ to $1440_N$ over network 1430. The client system 1420 typically includes one or more user interface devices 22 (such as a keyboard, a mouse, a roller ball, a touch screen, a pen or the like) for interacting with a graphical user interface (GUI) of the web browser on a display (e.g., monitor screen, LCD display, etc.).

In some embodiments, the client system 1420 and/or system servers $1440_1$ to $1440_N$ are configured to perform the methods described herein. The methods of some embodiments may be implemented in software or hardware configured to optimize the selection of additional content to be displayed to a user.

Figure 15:
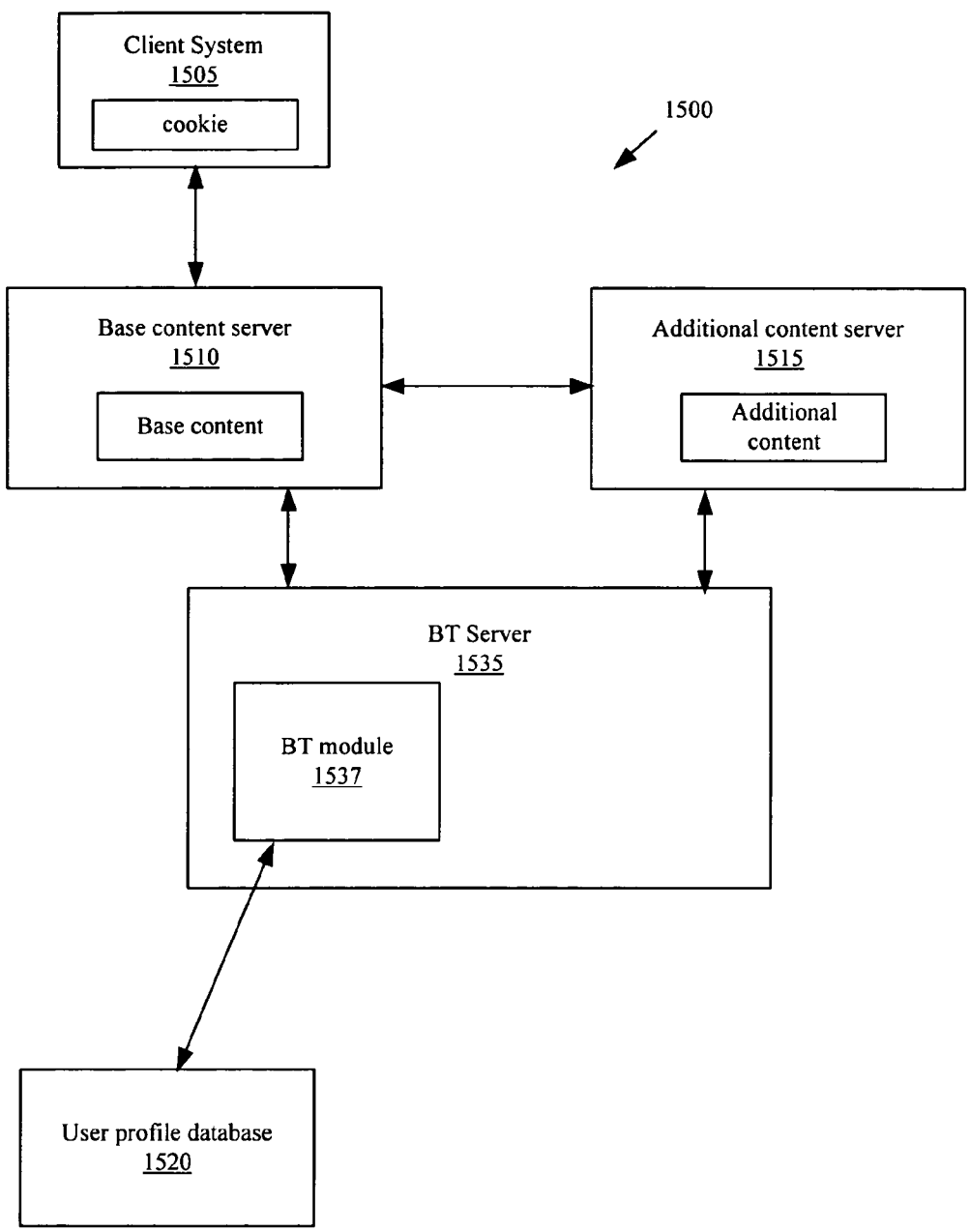
FIG. 15 shows a conceptual diagram of a behavioral targeting system.

FIG. 15 shows a conceptual diagram of a behavioral targeting system 1500. The behavioral targeting system 1500 includes a client system 1505, a base content server 1510 (containing base content), an additional content server 1515 (containing additional content), a database of user profiles 1520, and behavioral targeting server 1535. The behavioral targeting server 1535 comprises an optimizer module 1537 that receives event information. The behavioral targeting system 1500 is configured to select additional content to be sent to a user based on the user's profile. The client system 1505 is configured to receive the base and additional content and display the base and additional content to the user (e.g., as a published web page). Various portions of the optimization system may reside in one or more servers (such as servers $1440_1$ to $1440_N$) and/or one or more client systems (such as client system 1420).

The user profile database 1520 stores user profiles for a plurality of users/client systems, each user profile having a unique user-identification number assigned for a particular client system 1505 used by a user. The user-identification number may be stored, for example, in a cookie on the client system 1505 used by the user. When a user requests a piece of base content from a base content server 1510, the cookie is transferred from the client system 1505 to the base content server 1510 and then to the behavioral targeting server 1535. The behavioral targeting server 1535 then uses the user-identification number in the cookie to retrieve the particular user profile from the user profile database 1520.

The behavioral targeting system may be implemented in either hardware or software. For the software implementation, the behavioral targeting system is software that includes a plurality of computer executable instructions for implementation on a general-purpose computer system. Prior to loading into a general-purpose computer system, the behavioral targeting system software may reside as encoded information on a computer readable medium, such as a magnetic floppy disk, magnetic tape, and compact disc read only memory (CD-ROM).

Although the present invention has been described in terms of specific exemplary embodiments, it will be appreciated that various modifications and alterations might be made by those skilled in the art without departing from the spirit and scope of the invention.

What is claimed is:

1. A method, implemented by at least one computer processor, for determining a user profile from online activity, the method comprising:

processing a user data set, comprising event information from a plurality of events, compiled from past on-line activity between users of the user data set and an entity;

analyzing the user data set to ascertain a level of performance of the event information to predict user interest in each of a plurality of categories, wherein a category specifies a subject matter;

generating a plurality of models, one for each of the plurality of categories, wherein each model comprises a plurality of weights for determining a user interest score in a corresponding category;

generating weights for the plurality of models by ascribing a predictive value to a plurality of types of the event information in accordance with the level of performance of a particular type of the event information to predict the user interest in a corresponding category;

storing the plurality of models at the entity for the plurality of categories;

receiving, at the entity, the event information from at least one event from a user;

classifying the event information in a particular category of the plurality of categories;

identifying a type of the received event information;

selecting a model, based on the particular category, to generate at least a user profile score for the particular category; and generating the at least one user profile score for the particular category by applying at least one weight based on the type of the received event information and the particular category from the model selected, wherein the user profile score indicates the user interest in the subject matter of the particular category.

2. The method as set forth in claim 1, further comprising:

adding at least one new model comprising new parameters and rules so as to provide extensibility;

receiving, at the entity, the event information;

selecting the new model to generate the user profile score; and generating the at least one user profile score in the particular category by applying the new parameters and rules from the new model selected to the user event information.

3. The method as set forth in claim 1, further comprising serving an advertisement to the user based on the user interest score.

4. The method as set forth in claim 1, wherein the plurality of weights comprise recency dimension weights that provide input to the user interest score based on how recent the event information occurred.

5. The method as set forth in claim 1, wherein the plurality of weights comprise intensity dimension weights that provides input to the user interest score based on effectiveness of the event information to predict the user interest in the particular category.

6. The method as set forth in claim 1, wherein the plurality of weights comprise frequency dimension weights that provides input to the user interest score based on frequency of occurrence of the event information.

7. The method as set forth in claim 1, wherein:
selecting the model to generate the user score comprises selecting a model based on a targeting objective; and
generating the at least one user interest score comprises generating a user interest score for the targeting objective.

8. The method as set forth in claim 7, wherein the targeting objective comprises brand advertising.

9. The method as set forth in claim 7, wherein the targeting objective comprises direct response advertising.

10. A system for determining user interest from online activity, the system comprising:
at least one server computer is configured for:
processing a user data set, comprising event information from a plurality of events, compiled from past on-line activity between users of the user data set and an entity,
analyzing the user data set to ascertain a level of performance of the event information to predict user interest in each of a plurality of categories, wherein a category specifies a subject matter,
generating a plurality of models, one for each of the plurality of categories, wherein each model comprises a plurality of weights for determining a user interest score in a corresponding category, and
generating weights for the plurality of models by ascribing a predictive value to a plurality of types of the event information in accordance with the level of performance of a particular type of the event information to predict the user interest in a corresponding category;
at least one storage device for storing the plurality of models at the entity for the plurality of categories;
the server computer is further configured for:
receiving, at the entity, the event information from at least one event from a user,
classifying the event information in a particular category of the plurality of categories,
identifying a type of the received event information, for selecting a model, based on the particular category, to generate at least a user profile score for the particular category, and
generating the at least one user profile score for the particular category by applying at least one weight based on the type of the received event information and the particular category from the model selected, wherein the user profile score indicates the user interest in the subject matter of the particular category.

11. The system as set forth in claim 10, wherein the system comprises an extensible system, such that at least one additional model is added without requiring change to the system.

12. The system as set forth in claim 10, further comprising an advertisement server computer for serving an advertisement to the user based on the user interest score.

13. The system as set forth in claim 10, wherein the plurality of weights comprise recency dimension weights that provide input to the user interest score based on how recent the event information occurred.

14. The system as set forth in claim 10, wherein the plurality of weights comprise intensity dimension weights that provides input to the user interest score based on effectiveness of the event information to predict user interest in the particular category.

15. The system as set forth in claim 10, wherein the plurality of weights comprise frequency dimension weights that provides input to the user interest score based on frequency of occurrence of the event information.

16. The system as set forth in claim 10, wherein the server computer is further configured for generating the user profile score for a target objective.

17. The system as set forth in claim 16, wherein the target objective comprises brand advertising.

18. The system as set forth in claim 16, wherein the target objective comprises direct response advertising.

19. A non-transitory computer readable storage medium comprising a set of instructions which, when executed by a computer, causes the computer to determine a user profile from online activity, the set of instructions for:
processing a user data set, comprising event information from a plurality of events, compiled from past on-line activity between users of the user data set and an entity;
analyzing the user data set to ascertain a level of performance of the event information to predict user interest in each of a plurality of categories, wherein a category specifies a subject matter;
generating a plurality of models, one for each of the plurality of categories, wherein each model comprises a plurality of weights for determining a user interest score in a corresponding category;
generating weights for the plurality of models by ascribing a predictive value to a plurality of types of the event information in accordance with the level of performance of a particular type of the event information to predict the user interest in a corresponding category;
storing the plurality of models at the entity for the plurality of categories;
receiving, at the entity, the event information from at least one event from a user;
classifying the event information in a particular category of the plurality of categories;
identifying a type of the received event information;
selecting a model, based on the particular category, to generate at least a user profile score for the particular category; and
generating the at least one user profile score for the particular category by applying at least one weight based on the type of the received event information and the particular category from the model selected, wherein the user profile score indicates the user interest in the subject matter of the particular category.

20. The non-transitory computer readable storage medium as set forth in claim 19, further comprising serving an advertisement to the user based on the user profile score.

21. The non-transitory computer readable storage medium as set forth in claim 19, wherein the plurality of weights comprise recency dimension weights that provide input to the user interest score based on how recent the event information occurred.

22. The non-transitory computer readable storage medium as set forth in claim 19, wherein the plurality of weights comprise intensity dimension weights that provides input to the user interest score based on effectiveness of the event information to predict the user interest in the particular category.

23. The non-transitory computer readable storage medium as set forth in claim 19, wherein the plurality of weights comprise frequency dimension weights that provides input to the user interest score based on frequency of occurrence of the event information.

24. The non-transitory computer readable storage medium as set forth in claim 19, wherein:
    selecting the model to generate the user score comprises selecting a model based on a target objective; and
    generating the at least one user profile score comprises generating a user profile score for the target objective.

* * * * *